12044851B2

United States Patent
Deng et al.

(10) Patent No.: US 12,044,851 B2
(45) Date of Patent: Jul. 23, 2024

(54) AIR POCKET STRUCTURES FOR PROMOTING TOTAL INTERNAL REFLECTION IN A WAVEGUIDE

(71) Applicant: Magic Leap, Inc., Plantation, FL (US)

(72) Inventors: Xiaopei Deng, Cedar Park, TX (US); Vikramjit Singh, Pflugerville, TX (US); Shuqiang Yang, Austin, TX (US); Kang Luo, Austin, TX (US); Nai-Wen Pi, Plano, TX (US); Frank Y. Xu, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 388 days.

(21) Appl. No.: 17/416,248

(22) PCT Filed: Dec. 20, 2019

(86) PCT No.: PCT/US2019/067919
§ 371 (c)(1),
(2) Date: Jun. 18, 2021

(87) PCT Pub. No.: WO2020/132484
PCT Pub. Date: Jun. 25, 2020

(65) Prior Publication Data
US 2022/0075118 A1 Mar. 10, 2022

Related U.S. Application Data

(60) Provisional application No. 62/783,778, filed on Dec. 21, 2018.

(51) Int. Cl.
*G02B 27/01* (2006.01)
*F21V 8/00* (2006.01)
(Continued)

(52) U.S. Cl.
CPC ........ *G02B 27/0172* (2013.01); *G02B 6/0011* (2013.01); *G02B 6/1223* (2013.01);
(Continued)

(58) Field of Classification Search
CPC .............. G02B 27/017; G02B 27/0172; G02B 2027/0178; G02B 6/0036; G02B 6/0065;
(Continued)

(56) References Cited

U.S. PATENT DOCUMENTS

| 4,344,092 A | 8/1982 | Miller |
| 4,652,930 A | 3/1987 | Crawford |

(Continued)

FOREIGN PATENT DOCUMENTS

| CN | 100416340 C | 9/2008 |
| CN | 101449270 A | 6/2009 |

(Continued)

OTHER PUBLICATIONS

"Communication Pursuant to Article 94(3) EPC mailed on Apr. 25, 2022", European Patent Application No. 18885707.2, (5 pages).
(Continued)

*Primary Examiner* — Michelle R Connelly
(74) *Attorney, Agent, or Firm* — Stephen M. De Klerk

(57) ABSTRACT

Recesses are formed on a front side and a rear side of a waveguide. A solid porogen material is spun onto the front side and the rear side and fills the recesses. First front and rear cap layers are then formed on raised formations of the waveguide and on the solid porogen material. The entire structure is then heated and the solid porogen material decomposes to a porogen gas. The first front and rear cap layers are porous to allow the porogen gas to escape and air to enter into the recesses. The air maximizes a difference in refractive indices between the high-index transparent material of the waveguide and the air to promote reflection in the
(Continued)

waveguide from interfaces between the waveguide and the air.

24 Claims, 14 Drawing Sheets

(51) Int. Cl.
  *G02B 6/10* (2006.01)
  *G02B 6/122* (2006.01)
  *G02B 6/13* (2006.01)
  *G02B 27/00* (2006.01)

(52) U.S. Cl.
  CPC ........... *G02B 6/13* (2013.01); *G02B 27/0081* (2013.01); *G02B 6/10* (2013.01); *G02B 2027/0174* (2013.01)

(58) Field of Classification Search
  CPC .................. G02B 6/0038; G02B 6/002; G02B 2027/015; G02B 2027/0152; G02B 27/0101; G02B 27/0955; G02B 27/01
  See application file for complete search history.

(56) References Cited

U.S. PATENT DOCUMENTS

| | | | |
|---|---|---|---|
| 4,810,080 | A | 3/1989 | Grendol et al. |
| 4,997,268 | A | 3/1991 | Dauvergne |
| 5,007,727 | A | 4/1991 | Kahaney et al. |
| 5,074,295 | A | 12/1991 | Willis |
| 5,240,220 | A | 8/1993 | Elberbaum |
| 5,251,635 | A | 10/1993 | Dumoulin et al. |
| 5,410,763 | A | 5/1995 | Bolle |
| 5,455,625 | A | 10/1995 | Englander |
| 5,495,286 | A | 2/1996 | Adair |
| 5,497,463 | A | 3/1996 | Stein et al. |
| 5,659,701 | A | 8/1997 | Amit et al. |
| 5,682,255 | A | 10/1997 | Friesem et al. |
| 5,689,669 | A | 11/1997 | Lynch |
| 5,689,835 | A | 11/1997 | Chao |
| 5,826,092 | A | 10/1998 | Flannery |
| 5,854,872 | A | 12/1998 | Tai |
| 5,864,365 | A | 1/1999 | Sramek et al. |
| 5,937,202 | A | 8/1999 | Crosetto |
| 6,002,853 | A | 12/1999 | De Hond |
| 6,012,811 | A | 1/2000 | Chao et al. |
| 6,016,160 | A | 1/2000 | Coombs et al. |
| 6,064,749 | A | 5/2000 | Hirota et al. |
| 6,076,927 | A | 6/2000 | Owens |
| 6,079,982 | A | 6/2000 | Meader |
| 6,117,923 | A | 9/2000 | Amagai et al. |
| 6,119,147 | A | 9/2000 | Toomey et al. |
| 6,124,977 | A | 9/2000 | Takahashi |
| 6,179,619 | B1 | 1/2001 | Tanaka |
| 6,191,809 | B1 | 2/2001 | Hori et al. |
| 6,219,045 | B1 | 4/2001 | Leahy et al. |
| 6,243,091 | B1 | 6/2001 | Berstis |
| 6,271,843 | B1 | 8/2001 | Lection et al. |
| 6,362,817 | B1 | 3/2002 | Powers et al. |
| 6,375,369 | B1 | 4/2002 | Schneider et al. |
| 6,385,735 | B1 | 5/2002 | Wilson |
| 6,396,522 | B1 | 5/2002 | Vu |
| 6,414,679 | B1 | 7/2002 | Miodonski et al. |
| 6,538,655 | B1 | 3/2003 | Kubota |
| 6,541,736 | B1 | 4/2003 | Huang et al. |
| 6,570,563 | B1 | 5/2003 | Honda |
| 6,573,903 | B2 | 6/2003 | Gantt |
| 6,590,593 | B1 | 7/2003 | Robertson et al. |
| 6,621,508 | B1 | 9/2003 | Shiraishi et al. |
| 6,690,393 | B2 | 2/2004 | Heron et al. |
| 6,757,068 | B2 | 6/2004 | Foxlin |
| 6,784,901 | B1 | 8/2004 | Harvfey et al. |
| 6,961,055 | B2 | 11/2005 | Doak |
| 7,046,515 | B1 | 5/2006 | Wyatt |
| 7,051,219 | B2 | 5/2006 | Hwang |
| 7,076,674 | B2 | 7/2006 | Cervantes |
| 7,111,290 | B1 | 9/2006 | Yates, Jr. |
| 7,119,819 | B1 | 10/2006 | Robertson et al. |
| 7,219,245 | B1 | 5/2007 | Raghuvanshi |
| 7,382,288 | B1 | 6/2008 | Wilson |
| 7,414,629 | B2 | 8/2008 | Santodomingo |
| 7,431,453 | B2 | 10/2008 | Hogan |
| 7,467,356 | B2 | 12/2008 | Gettman et al. |
| 7,542,040 | B2 | 6/2009 | Templeman |
| 7,573,640 | B2 | 8/2009 | Nivon et al. |
| 7,653,877 | B2 | 1/2010 | Matsuda |
| 7,663,625 | B2 | 2/2010 | Chartier et al. |
| 7,724,980 | B1 | 5/2010 | Shenzhi |
| 7,746,343 | B1 | 6/2010 | Charaniya et al. |
| 7,751,662 | B2 | 7/2010 | Kleemann |
| 7,758,185 | B2 | 7/2010 | Lewis |
| 7,788,323 | B2 | 8/2010 | Greenstein et al. |
| 7,804,507 | B2 | 9/2010 | Yang et al. |
| 7,814,429 | B2 | 10/2010 | Buffet et al. |
| 7,817,150 | B2 | 10/2010 | Reichard et al. |
| 7,844,724 | B2 | 11/2010 | Van Wie et al. |
| 8,060,759 | B1 | 11/2011 | Arnan et al. |
| 8,120,851 | B2 | 2/2012 | Iwasa |
| 8,214,660 | B2 | 7/2012 | Capps, Jr. |
| 8,246,408 | B2 | 8/2012 | Elliot |
| 8,353,594 | B2 | 1/2013 | Lewis |
| 8,360,578 | B2 | 1/2013 | Nummela et al. |
| 8,408,696 | B2 | 4/2013 | Hsieh |
| 8,508,676 | B2 | 8/2013 | Silverstein et al. |
| 8,547,638 | B2 | 10/2013 | Levola |
| 8,605,764 | B1 | 10/2013 | Rothaar et al. |
| 8,619,365 | B2 | 12/2013 | Harris et al. |
| 8,696,113 | B2 | 4/2014 | Lewis |
| 8,698,701 | B2 | 4/2014 | Margulis |
| 8,733,927 | B1 | 5/2014 | Lewis |
| 8,736,636 | B2 | 5/2014 | Kang |
| 8,759,929 | B2 | 6/2014 | Shiozawa et al. |
| 8,793,770 | B2 | 7/2014 | Lim |
| 8,823,855 | B2 | 9/2014 | Hwang |
| 8,847,988 | B2 | 9/2014 | Geisner et al. |
| 8,874,673 | B2 | 10/2014 | Kim |
| 9,010,929 | B2 | 4/2015 | Lewis |
| 9,015,501 | B2 | 4/2015 | Gee |
| 9,086,537 | B2 | 7/2015 | Iwasa et al. |
| 9,095,437 | B2 | 8/2015 | Boyden et al. |
| 9,239,473 | B2 | 1/2016 | Lewis |
| 9,244,293 | B2 | 1/2016 | Lewis |
| 9,244,533 | B2 | 1/2016 | Friend et al. |
| 9,383,823 | B2 | 7/2016 | Geisner et al. |
| 9,489,027 | B1 | 11/2016 | Ogletree |
| 9,519,305 | B2 | 12/2016 | Wolfe |
| 9,581,820 | B2 | 2/2017 | Robbins |
| 9,582,060 | B2 | 2/2017 | Balatsos |
| 9,658,473 | B2 | 5/2017 | Lewis |
| 9,671,566 | B2 | 6/2017 | Abovitz et al. |
| 9,671,615 | B1 | 6/2017 | Vallius et al. |
| 9,696,795 | B2 | 7/2017 | Marcolina et al. |
| 9,798,144 | B2 | 10/2017 | Sako et al. |
| 9,874,664 | B2 | 1/2018 | Stevens et al. |
| 9,880,441 | B1 | 1/2018 | Osterhout |
| 9,918,058 | B2 | 3/2018 | Takahasi et al. |
| 9,955,862 | B2 | 5/2018 | Freeman et al. |
| 9,978,118 | B1 | 5/2018 | Ozgumer et al. |
| 9,996,797 | B1 | 6/2018 | Holz et al. |
| 10,018,844 | B2 | 7/2018 | Levola et al. |
| 10,082,865 | B1 | 9/2018 | Raynal et al. |
| 10,151,937 | B2 | 12/2018 | Lewis |
| 10,185,147 | B2 | 1/2019 | Lewis |
| 10,218,679 | B1 | 2/2019 | Jawahar |
| 10,241,545 | B1 | 3/2019 | Richards et al. |
| 10,317,680 | B1 | 6/2019 | Richards et al. |
| 10,436,594 | B2 | 10/2019 | Belt et al. |
| 10,516,853 | B1 | 12/2019 | Gibson et al. |
| 10,551,879 | B1 | 2/2020 | Richards et al. |
| 10,578,870 | B2 | 3/2020 | Kimmel |
| 10,698,202 | B2 | 6/2020 | Kimmel et al. |
| 10,856,107 | B2 | 10/2020 | Mycek et al. |
| 10,825,424 | B2 | 11/2020 | Zhang |

(56) References Cited

U.S. PATENT DOCUMENTS

| | | |
|---|---|---|
| 10,987,176 B2 | 4/2021 | Poltaretskyi et al. |
| 11,190,681 B1 | 11/2021 | Brook et al. |
| 11,209,656 B1 | 12/2021 | Choi et al. |
| 11,236,993 B1 | 2/2022 | Hall et al. |
| 11,262,585 B2 * | 3/2022 | Potnis .................. G02B 6/004 |
| 11,710,430 B1 | 7/2023 | Wray |
| 2001/0010598 A1 | 8/2001 | Aritake et al. |
| 2001/0018667 A1 | 8/2001 | Kim |
| 2002/0007463 A1 | 1/2002 | Fung |
| 2002/0108064 A1 | 2/2002 | Nunally |
| 2002/0063913 A1 | 5/2002 | Nakamura et al. |
| 2002/0071050 A1 | 6/2002 | Homberg |
| 2002/0095463 A1 | 7/2002 | Matsuda |
| 2002/0113820 A1 | 8/2002 | Robinson et al. |
| 2002/0122648 A1 | 9/2002 | Mule' et al. |
| 2002/0140848 A1 | 10/2002 | Cooper et al. |
| 2003/0028816 A1 | 2/2003 | Bacon |
| 2003/0048456 A1 | 3/2003 | Hill |
| 2003/0067685 A1 | 4/2003 | Niv |
| 2003/0077458 A1 | 4/2003 | Korenaga et al. |
| 2003/0080976 A1 | 5/2003 | Satoh et al. |
| 2003/0115494 A1 | 6/2003 | Cervantes |
| 2003/0218614 A1 | 11/2003 | Lavelle et al. |
| 2003/0219992 A1 | 11/2003 | Schaper |
| 2003/0226047 A1 | 12/2003 | Park |
| 2004/0001533 A1 | 1/2004 | Tran et al. |
| 2004/0021600 A1 | 2/2004 | Wittenberg |
| 2004/0025069 A1 | 2/2004 | Gary et al. |
| 2004/0042377 A1 | 3/2004 | Nikoloai et al. |
| 2004/0073822 A1 | 4/2004 | Greco |
| 2004/0073825 A1 | 4/2004 | Itoh |
| 2004/0111248 A1 | 6/2004 | Granny et al. |
| 2004/0113887 A1 | 6/2004 | Pair et al. |
| 2004/0174496 A1 | 9/2004 | Ji et al. |
| 2004/0186902 A1 | 9/2004 | Stewart |
| 2004/0193441 A1 | 9/2004 | Altieri |
| 2004/0201857 A1 | 10/2004 | Foxlin |
| 2004/0238732 A1 | 12/2004 | State et al. |
| 2004/0240072 A1 | 12/2004 | Schindler et al. |
| 2004/0246391 A1 | 12/2004 | Travis |
| 2004/0268159 A1 | 12/2004 | Aasheim et al. |
| 2005/0001977 A1 | 1/2005 | Zelman |
| 2005/0034002 A1 | 2/2005 | Flautner |
| 2005/0093719 A1 | 5/2005 | Okamoto et al. |
| 2005/0128212 A1 | 6/2005 | Edecker et al. |
| 2005/0157159 A1 | 7/2005 | Komiya et al. |
| 2005/0177385 A1 | 8/2005 | Hull |
| 2005/0231599 A1 | 10/2005 | Yamasaki |
| 2005/0273792 A1 | 12/2005 | Inohara et al. |
| 2006/0013435 A1 | 1/2006 | Rhoads |
| 2006/0015821 A1 | 1/2006 | Jacques Parker et al. |
| 2006/0019723 A1 | 1/2006 | Vorenkamp |
| 2006/0038880 A1 | 2/2006 | Starkweather et al. |
| 2006/0050224 A1 | 3/2006 | Smith |
| 2006/0090092 A1 | 4/2006 | Verhulst |
| 2006/0126181 A1 | 6/2006 | Levola |
| 2006/0129852 A1 | 6/2006 | Bonola |
| 2006/0132914 A1 | 6/2006 | Weiss et al. |
| 2006/0179329 A1 | 8/2006 | Terechko |
| 2006/0221448 A1 | 10/2006 | Nivon et al. |
| 2006/0228073 A1 | 10/2006 | Mukawa et al. |
| 2006/0250322 A1 | 11/2006 | Hall et al. |
| 2006/0259621 A1 | 11/2006 | Ranganathan |
| 2006/0268220 A1 | 11/2006 | Hogan |
| 2007/0058248 A1 | 3/2007 | Nguyen et al. |
| 2007/0103836 A1 | 5/2007 | Oh |
| 2007/0124730 A1 | 5/2007 | Pytel |
| 2007/0159673 A1 | 7/2007 | Freeman et al. |
| 2007/0188837 A1 | 8/2007 | Shimizu et al. |
| 2007/0198886 A1 | 8/2007 | Saito |
| 2007/0204672 A1 | 9/2007 | Huang et al. |
| 2007/0213952 A1 | 9/2007 | Cirelli |
| 2007/0283247 A1 | 12/2007 | Brenneman et al. |
| 2008/0002259 A1 | 1/2008 | Ishizawa et al. |
| 2008/0002260 A1 | 1/2008 | Arrouy et al. |
| 2008/0030429 A1 | 2/2008 | Hailpern |
| 2008/0043334 A1 | 2/2008 | Itzkovitch et al. |
| 2008/0046773 A1 | 2/2008 | Ham |
| 2008/0063802 A1 | 3/2008 | Maula et al. |
| 2008/0068557 A1 | 3/2008 | Menduni et al. |
| 2008/0084533 A1 | 4/2008 | Jannard et al. |
| 2008/0125218 A1 | 5/2008 | Collins |
| 2008/0146942 A1 | 6/2008 | Dala-Krishna |
| 2008/0173036 A1 | 7/2008 | Willaims |
| 2008/0177506 A1 | 7/2008 | Kim |
| 2008/0183190 A1 | 7/2008 | Adcox et al. |
| 2008/0205838 A1 | 8/2008 | Crippa et al. |
| 2008/0215907 A1 | 9/2008 | Wilson |
| 2008/0225393 A1 | 9/2008 | Rinko |
| 2008/0235570 A1 | 9/2008 | Sawada et al. |
| 2008/0246693 A1 | 10/2008 | Hailpern et al. |
| 2008/0316768 A1 | 12/2008 | Travis |
| 2009/0076791 A1 | 3/2009 | Rhoades et al. |
| 2009/0091583 A1 | 4/2009 | McCoy |
| 2009/0153797 A1 | 6/2009 | Allon et al. |
| 2009/0224416 A1 | 9/2009 | Laakkonen et al. |
| 2009/0245730 A1 | 10/2009 | Kleemann |
| 2009/0287728 A1 | 11/2009 | Martine et al. |
| 2009/0300528 A1 | 12/2009 | Stambaugh |
| 2009/0310633 A1 | 12/2009 | Ikegami |
| 2010/0005326 A1 | 1/2010 | Archer |
| 2010/0019962 A1 | 1/2010 | Fujita |
| 2010/0056274 A1 | 3/2010 | Uusitalo et al. |
| 2010/0063854 A1 | 3/2010 | Purvis et al. |
| 2010/0070378 A1 | 3/2010 | Trotman et al. |
| 2010/0079841 A1 | 4/2010 | Levola |
| 2010/0115428 A1 | 5/2010 | Shuping et al. |
| 2010/0153934 A1 | 6/2010 | Lachner |
| 2010/0194632 A1 | 8/2010 | Raento et al. |
| 2010/0205541 A1 | 8/2010 | Rappaport et al. |
| 2010/0214284 A1 | 8/2010 | Rieffel et al. |
| 2010/0232016 A1 | 9/2010 | Landa et al. |
| 2010/0232031 A1 | 9/2010 | Batchko et al. |
| 2010/0244168 A1 | 9/2010 | Shiozawa et al. |
| 2010/0274567 A1 | 10/2010 | Carlson et al. |
| 2010/0274627 A1 | 10/2010 | Carlson |
| 2010/0277803 A1 | 11/2010 | Pockett et al. |
| 2010/0284085 A1 | 11/2010 | Laakkonen |
| 2010/0287485 A1 | 11/2010 | Bertolami et al. |
| 2010/0296163 A1 | 11/2010 | Sarikko |
| 2010/0309687 A1 * | 12/2010 | Sampsell .............. G02B 6/0053 |
| | | 362/627 |
| 2011/0010636 A1 | 1/2011 | Hamilton, II et al. |
| 2011/0021263 A1 | 1/2011 | Anderson et al. |
| 2011/0022870 A1 | 1/2011 | Mcgrane |
| 2011/0041083 A1 | 2/2011 | Gabai et al. |
| 2011/0050640 A1 | 3/2011 | Lundback et al. |
| 2011/0050655 A1 | 3/2011 | Mukawa |
| 2011/0064268 A1 | 3/2011 | Cobb et al. |
| 2011/0122240 A1 | 5/2011 | Becker |
| 2011/0145617 A1 | 6/2011 | Thomson et al. |
| 2011/0170801 A1 | 7/2011 | Lu et al. |
| 2011/0218733 A1 | 9/2011 | Hamza et al. |
| 2011/0286735 A1 | 11/2011 | Temblay |
| 2011/0291969 A1 | 12/2011 | Rashid et al. |
| 2012/0011389 A1 | 1/2012 | Driesen |
| 2012/0050535 A1 | 3/2012 | Densham et al. |
| 2012/0075501 A1 | 3/2012 | Oyagi et al. |
| 2012/0081392 A1 | 4/2012 | Arthur |
| 2012/0089854 A1 | 4/2012 | Breakstone |
| 2012/0113235 A1 | 5/2012 | Shintani |
| 2012/0127062 A1 | 5/2012 | Bar-Zeev et al. |
| 2012/0154557 A1 | 6/2012 | Perez et al. |
| 2012/0215094 A1 | 8/2012 | Rahimian et al. |
| 2012/0218301 A1 | 8/2012 | Miller |
| 2012/0246506 A1 | 9/2012 | Knight |
| 2012/0249416 A1 | 10/2012 | Maciocci et al. |
| 2012/0249741 A1 | 10/2012 | Maciocci et al. |
| 2012/0260083 A1 | 10/2012 | Andrews |
| 2012/0307075 A1 | 12/2012 | Margalitq |
| 2012/0307362 A1 | 12/2012 | Silverstein et al. |
| 2012/0314959 A1 | 12/2012 | White et al. |
| 2012/0320460 A1 | 12/2012 | Levola |
| 2012/0326948 A1 | 12/2012 | Crocco et al. |

(56) References Cited

U.S. PATENT DOCUMENTS

| | | |
|---|---|---|
| 2013/0021486 A1 | 1/2013 | Richardon |
| 2013/0050642 A1 | 2/2013 | Lewis et al. |
| 2013/0050833 A1 | 2/2013 | Lewis et al. |
| 2013/0051730 A1 | 2/2013 | Travers et al. |
| 2013/0061240 A1 | 3/2013 | Yan et al. |
| 2013/0077049 A1 | 3/2013 | Bohn |
| 2013/0077170 A1 | 3/2013 | Ukuda |
| 2013/0094148 A1 | 4/2013 | Sloane |
| 2013/0129282 A1 | 5/2013 | Li |
| 2013/0162940 A1 | 6/2013 | Kurtin et al. |
| 2013/0169923 A1 | 7/2013 | Schnoll et al. |
| 2013/0205126 A1 | 8/2013 | Kruglick |
| 2013/0222386 A1 | 8/2013 | Tannhauser et al. |
| 2013/0268257 A1 | 10/2013 | Hu |
| 2013/0278633 A1 | 10/2013 | Ahn et al. |
| 2013/0314789 A1 | 11/2013 | Saarikko et al. |
| 2013/0318276 A1 | 11/2013 | Dalal |
| 2013/0336138 A1 | 12/2013 | Venkatraman et al. |
| 2013/0342564 A1 | 12/2013 | Kinnebrew et al. |
| 2013/0342570 A1 | 12/2013 | Kinnebrew et al. |
| 2013/0342571 A1 | 12/2013 | Kinnebrew et al. |
| 2013/0343408 A1 | 12/2013 | Cook |
| 2014/0002329 A1 | 1/2014 | Nishimaki et al. |
| 2014/0013098 A1 | 1/2014 | Yeung |
| 2014/0016821 A1 | 1/2014 | Arth et al. |
| 2014/0022819 A1 | 1/2014 | Oh et al. |
| 2014/0078023 A1 | 3/2014 | Ikeda et al. |
| 2014/0082526 A1 | 3/2014 | Park et al. |
| 2014/0119598 A1 | 5/2014 | Ramachandran et al. |
| 2014/0126769 A1 | 5/2014 | Reitmayr et al. |
| 2014/0140653 A1 | 5/2014 | Brown et al. |
| 2014/0149573 A1 | 5/2014 | Tofighbakhsh et al. |
| 2014/0168260 A1 | 6/2014 | O'Brien et al. |
| 2014/0244983 A1 | 8/2014 | McDonald et al. |
| 2014/0266987 A1 | 9/2014 | Magyari |
| 2014/0267419 A1 | 9/2014 | Ballard et al. |
| 2014/0274391 A1 | 9/2014 | Stafford |
| 2014/0282105 A1 | 9/2014 | Nordstrom |
| 2014/0292645 A1 | 10/2014 | Tsurumi et al. |
| 2014/0309031 A1 | 10/2014 | Suzuki |
| 2014/0313228 A1 | 10/2014 | Kasahara |
| 2014/0333612 A1 | 11/2014 | Itoh et al. |
| 2014/0359589 A1 | 12/2014 | Kodsky et al. |
| 2014/0375680 A1 | 12/2014 | Ackerman et al. |
| 2015/0005785 A1 | 1/2015 | Olson |
| 2015/0009099 A1 | 1/2015 | Queen |
| 2015/0015842 A1 | 1/2015 | Chen |
| 2015/0077312 A1 | 3/2015 | Wang |
| 2015/0097719 A1 | 4/2015 | Balachandreswaran et al. |
| 2015/0123966 A1 | 5/2015 | Newman |
| 2015/0130790 A1 | 5/2015 | Vasquez, II et al. |
| 2015/0134995 A1 | 5/2015 | Park et al. |
| 2015/0138248 A1 | 5/2015 | Schrader |
| 2015/0155939 A1 | 6/2015 | Oshima et al. |
| 2015/0168221 A1 | 6/2015 | Mao et al. |
| 2015/0205126 A1 | 7/2015 | Schowengerdt |
| 2015/0235427 A1 | 8/2015 | Nobori et al. |
| 2015/0235431 A1 | 8/2015 | Schowengerdt |
| 2015/0253651 A1 | 9/2015 | Russell et al. |
| 2015/0256484 A1 | 9/2015 | Cameron |
| 2015/0269784 A1 | 9/2015 | Miyawaki et al. |
| 2015/0294483 A1 | 10/2015 | Wells et al. |
| 2015/0301955 A1 | 10/2015 | Yakovenko et al. |
| 2015/0310657 A1 | 10/2015 | Eden |
| 2015/0338915 A1 | 11/2015 | Publicover et al. |
| 2015/0355481 A1 | 12/2015 | Hilkes et al. |
| 2016/0004102 A1 | 1/2016 | Nisper et al. |
| 2016/0015470 A1 | 1/2016 | Border |
| 2016/0027215 A1 | 1/2016 | Burns et al. |
| 2016/0033770 A1 | 2/2016 | Fujimaki et al. |
| 2016/0051217 A1 | 2/2016 | Douglas et al. |
| 2016/0077338 A1 | 3/2016 | Robbins et al. |
| 2016/0085285 A1 | 3/2016 | Mangione-Smith |
| 2016/0085300 A1 | 3/2016 | Robbins et al. |
| 2016/0091720 A1 | 3/2016 | Stafford et al. |
| 2016/0093099 A1 | 3/2016 | Bridges |
| 2016/0093269 A1 | 3/2016 | Buckley et al. |
| 2016/0103326 A1 | 4/2016 | Kimura et al. |
| 2016/0123745 A1 | 5/2016 | Cotier et al. |
| 2016/0139402 A1 | 5/2016 | Lapstun |
| 2016/0139411 A1 | 5/2016 | Kang et al. |
| 2016/0155273 A1 | 6/2016 | Lyren et al. |
| 2016/0180596 A1 | 6/2016 | Gonzalez del Rosario |
| 2016/0187654 A1 | 6/2016 | Border et al. |
| 2016/0191887 A1 | 6/2016 | Casas |
| 2016/0202496 A1 | 7/2016 | Billetz et al. |
| 2016/0217624 A1 | 7/2016 | Finn et al. |
| 2016/0266412 A1 | 9/2016 | Yoshida |
| 2016/0267708 A1 | 9/2016 | Nistico et al. |
| 2016/0274733 A1 | 9/2016 | Hasegawa et al. |
| 2016/0287337 A1 | 10/2016 | Aram et al. |
| 2016/0300388 A1 | 10/2016 | Stafford et al. |
| 2016/0321551 A1 | 11/2016 | Priness et al. |
| 2016/0327798 A1 | 11/2016 | Xiao et al. |
| 2016/0334279 A1 | 11/2016 | Mittleman et al. |
| 2016/0357255 A1 | 12/2016 | Lindh et al. |
| 2016/0370404 A1 | 12/2016 | Quadrat et al. |
| 2016/0370510 A1 | 12/2016 | Thomas |
| 2017/0038607 A1 | 2/2017 | Camara |
| 2017/0060225 A1 | 3/2017 | Zha et al. |
| 2017/0061696 A1 | 3/2017 | Li et al. |
| 2017/0064066 A1 | 3/2017 | Das et al. |
| 2017/0100664 A1 | 4/2017 | Osterhout et al. |
| 2017/0102544 A1 | 4/2017 | Vallius et al. |
| 2017/0115487 A1 | 4/2017 | Travis |
| 2017/0122725 A1 | 5/2017 | Yeoh et al. |
| 2017/0123526 A1 | 5/2017 | Trail et al. |
| 2017/0127295 A1 | 5/2017 | Black et al. |
| 2017/0131569 A1 | 5/2017 | Aschwanden et al. |
| 2017/0147066 A1 | 5/2017 | Katz et al. |
| 2017/0160518 A1 | 6/2017 | Lanman et al. |
| 2017/0161951 A1 | 6/2017 | Fix et al. |
| 2017/0185261 A1 | 6/2017 | Perez et al. |
| 2017/0192239 A1 | 7/2017 | Nakamura et al. |
| 2017/0201709 A1 | 7/2017 | Igarashi et al. |
| 2017/0205903 A1 | 7/2017 | Miller et al. |
| 2017/0206668 A1 | 7/2017 | Poulos et al. |
| 2017/0213388 A1 | 7/2017 | Margolis et al. |
| 2017/0214907 A1 | 7/2017 | Lapstun |
| 2017/0219841 A1 | 8/2017 | Popovich et al. |
| 2017/0232345 A1 | 8/2017 | Rofougaran et al. |
| 2017/0235126 A1 | 8/2017 | DiDomenico |
| 2017/0235129 A1 | 8/2017 | Kamakura |
| 2017/0235142 A1 | 8/2017 | Wall et al. |
| 2017/0235144 A1 | 8/2017 | Piskunov et al. |
| 2017/0235147 A1 | 8/2017 | Kamakura |
| 2017/0243403 A1 | 8/2017 | Daniels et al. |
| 2017/0246070 A1 | 8/2017 | Osterhout et al. |
| 2017/0254832 A1 | 9/2017 | Ho et al. |
| 2017/0256096 A1 | 9/2017 | Faaborg et al. |
| 2017/0258526 A1 | 9/2017 | Lang |
| 2017/0266529 A1 | 9/2017 | Reikmoto |
| 2017/0270712 A1 | 9/2017 | Tyson et al. |
| 2017/0281054 A1 | 10/2017 | Stever et al. |
| 2017/0287376 A1 | 10/2017 | Bakar et al. |
| 2017/0293141 A1 | 10/2017 | Schowengerdt et al. |
| 2017/0307886 A1 | 10/2017 | Stenberg et al. |
| 2017/0307891 A1 | 10/2017 | Bucknor et al. |
| 2017/0312032 A1 | 11/2017 | Amanatullah et al. |
| 2017/0322418 A1 | 11/2017 | Lin et al. |
| 2017/0322426 A1 | 11/2017 | Tervo |
| 2017/0329137 A1 | 11/2017 | Tervo |
| 2017/0332098 A1 | 11/2017 | Rusanovskyy et al. |
| 2017/0336636 A1 | 11/2017 | Amitai et al. |
| 2017/0357332 A1 | 12/2017 | Balan et al. |
| 2017/0371394 A1 | 12/2017 | Chan |
| 2017/0371661 A1 | 12/2017 | Sparling |
| 2018/0014266 A1 | 1/2018 | Chen |
| 2018/0024289 A1 | 1/2018 | Fattal |
| 2018/0044173 A1 | 2/2018 | Netzer |
| 2018/0052007 A1 | 2/2018 | Teskey et al. |
| 2018/0052501 A1 | 2/2018 | Jones, Jr. et al. |
| 2018/0059305 A1 | 3/2018 | Popovich et al. |
| 2018/0067779 A1 | 3/2018 | Pillamarri et al. |

(56) References Cited

U.S. PATENT DOCUMENTS

| | | |
|---|---|---|
| 2018/0070855 A1 | 3/2018 | Eichler |
| 2018/0082480 A1 | 3/2018 | White et al. |
| 2018/0084245 A1 | 3/2018 | Lapstun |
| 2018/0088185 A1 | 3/2018 | Woods et al. |
| 2018/0102981 A1 | 4/2018 | Kurtzman et al. |
| 2018/0108179 A1 | 4/2018 | Tomlin et al. |
| 2018/0114298 A1 | 4/2018 | Malaika et al. |
| 2018/0129112 A1 | 5/2018 | Osterhout |
| 2018/0131907 A1 | 5/2018 | Schmirler et al. |
| 2018/0136466 A1 | 5/2018 | Ko |
| 2018/0144691 A1 | 5/2018 | Choi et al. |
| 2018/0150971 A1 | 5/2018 | Adachi et al. |
| 2018/0151796 A1 | 5/2018 | Akahane |
| 2018/0172995 A1 | 6/2018 | Lee et al. |
| 2018/0188115 A1 | 7/2018 | Hsu et al. |
| 2018/0189568 A1 | 7/2018 | Powderly et al. |
| 2018/0190017 A1 | 7/2018 | Mendez et al. |
| 2018/0191990 A1 | 7/2018 | Motoyama et al. |
| 2018/0217395 A1 | 8/2018 | Lin et al. |
| 2018/0218545 A1 | 8/2018 | Garcia et al. |
| 2018/0250589 A1 | 9/2018 | Cossairt et al. |
| 2018/0260218 A1 | 9/2018 | Gopal |
| 2018/0284877 A1 | 10/2018 | Klein |
| 2018/0292654 A1 | 10/2018 | Wall et al. |
| 2018/0299678 A1 | 10/2018 | Singer et al. |
| 2018/0357472 A1 | 12/2018 | Dreessen |
| 2019/0005069 A1 | 1/2019 | Filgueiras de Araujo et al. |
| 2019/0011691 A1 | 1/2019 | Peyman |
| 2019/0056591 A1 | 2/2019 | Tervo et al. |
| 2019/0087015 A1 | 3/2019 | Lam et al. |
| 2019/0101758 A1 | 4/2019 | Zhu et al. |
| 2019/0107723 A1 | 4/2019 | Lee et al. |
| 2019/0137788 A1 | 5/2019 | Suen |
| 2019/0155034 A1 | 5/2019 | Singer et al. |
| 2019/0155439 A1 | 5/2019 | Mukherjee et al. |
| 2019/0158926 A1 | 5/2019 | Kang et al. |
| 2019/0162950 A1 | 5/2019 | Lapstun |
| 2019/0167095 A1 | 6/2019 | Krueger |
| 2019/0172216 A1 | 6/2019 | Ninan et al. |
| 2019/0178654 A1 | 6/2019 | Hare |
| 2019/0182415 A1 | 6/2019 | Sivan |
| 2019/0196690 A1 | 6/2019 | Chong et al. |
| 2019/0206116 A1 | 7/2019 | Xu et al. |
| 2019/0219815 A1 | 7/2019 | Price et al. |
| 2019/0243123 A1 | 8/2019 | Bohn |
| 2019/0287270 A1 | 9/2019 | Nakamura et al. |
| 2019/0318502 A1 | 10/2019 | He et al. |
| 2019/0318540 A1 | 10/2019 | Piemonte et al. |
| 2019/0321728 A1 | 10/2019 | Imai et al. |
| 2019/0347853 A1 | 11/2019 | Chen et al. |
| 2019/0380792 A1 | 12/2019 | Poltaretskyi et al. |
| 2019/0388182 A1 | 12/2019 | Kumar et al. |
| 2020/0066045 A1 | 2/2020 | Stahl et al. |
| 2020/0098188 A1 | 3/2020 | Bar-Zeev et al. |
| 2020/0100057 A1 | 3/2020 | Galon et al. |
| 2020/0110928 A1 | 4/2020 | Al Jazaery et al. |
| 2020/0117267 A1 | 4/2020 | Gibson et al. |
| 2020/0117270 A1 | 4/2020 | Gibson et al. |
| 2020/0184217 A1 | 6/2020 | Faulkner |
| 2020/0184219 A1 | 6/2020 | Magura et al. |
| 2020/0184653 A1 | 6/2020 | Faulker |
| 2020/0202759 A1 | 6/2020 | Ukai et al. |
| 2020/0242848 A1 | 7/2020 | Ambler et al. |
| 2020/0309944 A1 | 10/2020 | Thoresen et al. |
| 2020/0356161 A1 | 11/2020 | Wagner |
| 2020/0368616 A1 | 11/2020 | Delamont |
| 2020/0391115 A1 | 12/2020 | Leeper et al. |
| 2020/0409528 A1 | 12/2020 | Lee |
| 2021/0008413 A1 | 1/2021 | Asikainen et al. |
| 2021/0033871 A1 | 2/2021 | Jacoby et al. |
| 2021/0041951 A1 | 2/2021 | Gibson et al. |
| 2021/0053820 A1 | 2/2021 | Gurin et al. |
| 2021/0093391 A1 | 4/2021 | Poltaretskyi et al. |
| 2021/0093410 A1 | 4/2021 | Gaborit et al. |
| 2021/0093414 A1 | 4/2021 | Moore et al. |
| 2021/0097886 A1 | 4/2021 | Kuester et al. |
| 2021/0124901 A1 | 4/2021 | Liu et al. |
| 2021/0132380 A1 | 5/2021 | Wieczorek |
| 2021/0141225 A1 | 5/2021 | Meynen et al. |
| 2021/0142582 A1 | 5/2021 | Jones et al. |
| 2021/0158023 A1 | 5/2021 | Fu et al. |
| 2021/0158627 A1 | 5/2021 | Cossairt et al. |
| 2021/0173480 A1 | 6/2021 | Osterhout et al. |
| 2022/0366598 A1 | 11/2022 | Azimi et al. |

FOREIGN PATENT DOCUMENTS

| | | |
|---|---|---|
| CN | 104040410 A | 9/2014 |
| CN | 104603675 A | 5/2015 |
| CN | 105938426 A | 9/2016 |
| CN | 106662754 A | 5/2017 |
| CN | 107683497 A1 | 2/2018 |
| CN | 109223121 A | 1/2019 |
| CN | 105190427 B | 11/2019 |
| EP | 0504930 A1 | 3/1992 |
| EP | 0535402 A1 | 4/1993 |
| EP | 1215522 A2 | 6/2002 |
| EP | 1938141 A1 | 7/2008 |
| EP | 1943556 A2 | 7/2008 |
| EP | 2290428 A2 | 3/2011 |
| EP | 3164776 B1 | 5/2017 |
| EP | 3236211 A1 | 10/2017 |
| EP | 2723240 B1 | 8/2018 |
| EP | 2896986 B1 | 2/2021 |
| GB | 2499635 A | 8/2013 |
| JP | H03-036974 U | 4/1991 |
| JP | H10-333094 A | 12/1998 |
| JP | 2003-029198 A | 1/2003 |
| JP | 2003-141574 A | 5/2003 |
| JP | 2003-228027 A | 8/2003 |
| JP | 2003-329873 A | 11/2003 |
| JP | 2005-303843 A | 10/2005 |
| JP | 2007-012530 A | 1/2007 |
| JP | 2007-86696 A | 4/2007 |
| JP | 2007-273733 A | 10/2007 |
| JP | 2008-257127 A | 10/2008 |
| JP | 2009-090689 A | 4/2009 |
| JP | 2009-244869 A | 10/2009 |
| JP | 2010-014443 A | 1/2010 |
| JP | 2010-139575 | 6/2010 |
| JP | 2011-033993 A | 2/2011 |
| JP | 2011-257203 A | 12/2011 |
| JP | 2011-530131 A | 12/2011 |
| JP | 2012-235036 A | 11/2012 |
| JP | 2013-206322 A | 10/2013 |
| JP | 2014-500522 A | 1/2014 |
| JP | 2014-192550 A | 10/2014 |
| JP | 2015-191032 A | 11/2015 |
| JP | 2016-502120 A | 1/2016 |
| JP | 2016-85463 A | 5/2016 |
| JP | 2016-126134 A | 7/2016 |
| JP | 2017-015697 A | 1/2017 |
| JP | 2017-153498 | 9/2017 |
| JP | 2017-531840 A | 10/2017 |
| JP | 2017-535825 A | 11/2017 |
| KR | 10-2006-0059992 A | 6/2006 |
| KR | 10-2011-0006408 | 1/2011 |
| KR | 10-2017-0017243 | 2/2017 |
| TW | 201219829 A | 5/2012 |
| TW | 201803289 A | 1/2018 |
| WO | 1991/000565 A2 | 1/1991 |
| WO | 2002/071315 A2 | 9/2002 |
| WO | 2006132614 A1 | 12/2006 |
| WO | 2007041678 A2 | 4/2007 |
| WO | 2007/037089 A1 | 5/2007 |
| WO | 2007/085682 A1 | 8/2007 |
| WO | 2007/102144 A1 | 9/2007 |
| WO | 2008148927 A1 | 12/2008 |
| WO | 2009/101238 A1 | 8/2009 |
| WO | 2010015807 A1 | 2/2010 |
| WO | 2014203440 A1 | 12/2010 |
| WO | 2013/049012 A1 | 4/2013 |
| WO | 2013/145536 A1 | 10/2013 |
| WO | 2014033306 A1 | 3/2014 |

(56) References Cited

FOREIGN PATENT DOCUMENTS

| | | |
|---|---|---|
| WO | 2015/079610 A1 | 6/2015 |
| WO | 2015/143641 A1 | 10/2015 |
| WO | 2015143641 A1 | 10/2015 |
| WO | 2015194597 A1 | 12/2015 |
| WO | 2016/054092 A1 | 4/2016 |
| WO | 2017004695 A1 | 1/2017 |
| WO | 2017044761 A1 | 3/2017 |
| WO | 2017049163 A1 | 3/2017 |
| WO | 2017051595 A1 | 3/2017 |
| WO | 2017120475 A1 | 7/2017 |
| WO | 2017176861 A1 | 10/2017 |
| WO | 2017/203201 A1 | 11/2017 |
| WO | 2017203201 A1 | 11/2017 |
| WO | 2018008232 A1 | 1/2018 |
| WO | 2018/031261 A1 | 2/2018 |
| WO | 2018022523 A1 | 2/2018 |
| WO | 2018/044537 A1 | 3/2018 |
| WO | 2018039273 A1 | 3/2018 |
| WO | 2018057564 A1 | 3/2018 |
| WO | 2018085287 A1 | 5/2018 |
| WO | 2018087408 A1 | 5/2018 |
| WO | 2018097831 A1 | 5/2018 |
| WO | 2018166921 A1 | 9/2018 |
| WO | 2018236587 A1 | 12/2018 |
| WO | 2019040493 A1 | 2/2019 |
| WO | 2019148154 A1 | 8/2019 |
| WO | 2020010226 A1 | 1/2020 |

OTHER PUBLICATIONS

"Communication Pursuant to Article 94(3) EPC mailed on May 30, 2022", European Patent Application No. 19768418.6, (6 pages).
"Extended European Search Report mailed on Jun. 19, 2020", European Patent Application No. 20154750.2, (10 pages).
"Extended European Search Report mailed on Mar. 22, 2022", European Patent Application No. 19843487.0, (14 pages).
"Extended European Search Report mailed on May 16, 2022", European Patent Application No. 19871001.4, (9 pages).
"Extended European Search Report mailed on May 30, 2022", European Patent Application No. 20753144.3, (10 pages).
"Final Office Action mailed on Jul. 13, 2022", U.S. Appl. No. 17/262,991, (18 pages).
"First Examination Report Mailed on May 13, 2022", Indian Patent Application No. 202047026359, (8 pages).
"First Office Action mailed on Mar. 14, 2022 with English translation", Chinese Patent Application No. 201880079474.6, (11 pages).
"Non Final Office Action mailed on Apr. 1, 2022", U.S. Appl. No. 17/256,961, (65 pages).
"Non Final Office Action mailed on Apr. 11, 2022", U.S. Appl. No. 16/938,782, (52 pages).
"Non Final Office Action mailed on Apr. 12, 2022", U.S. Appl. No. 17/262,991, (60 pages).
"Non Final Office Action mailed on Jul. 26, 2022", U.S. Appl. No. 17/098,059, (28 pages).
"Non Final Office Action mailed on Mar. 31, 2022", U.S. Appl. No. 17/257,814, (60 pages).
"Non Final Office Action mailed on Mar. 9, 2022", U.S. Appl. No. 16/870,676, (57 pages).
"Non Final Office Action mailed on May 10, 2022", U.S. Appl. No. 17/140,921, (25 pages).
"Non Final Office Action mailed on May 17, 2022", U.S. Appl. No. 16/748,193, (11 pages).
Communication according to Rule 164(1) EPC, European Patent Application No. 20753144.3, mailed on Feb. 23, 2022, (11 pages).
Communication Pursuant to Article 94(3) EPC mailed on Jan. 4, 2022, European Patent Application No. 20154070.5, (8 pages).
Extended European Search Report mailed on Jan. 28, 2022, European Patent Application No. 19815876.8, (9 pages).
Extended European Search Report mailed on Jan. 4, 2022, European Patent Application No. 19815085.6, (9 pages).

Final Office Action mailed on Feb. 23, 2022, U.S. Appl. No. 16/748,193, (23 pages).
Final Office Action mailed on Feb. 3, 2022, U.S. Appl. No. 16/864,721, (36 pages).
"Multi-core processor", TechTarget , 2013 , (1 page).
Non Final Office Action mailed on Feb. 2, 2022, U.S. Appl. No. 16/783,866, (8 pages).
Mrad , et al. , "A framework for System Level Low Power Design Space Exploration" , 1991.
"Decision of Rejection mailed on Jan. 5, 2023 with English translation", Chinese Patent Application No. 201880079474.6, (10 pages).
"Extended European Search Report issued on Dec. 14, 2022", European Patent Application No. 20886547.7, (8 pages).
"Extended European Search Report mailed on Nov. 3, 2022", European Patent Application No. 20770244.0, (23 bages).
"Final Office Action mailed on Dec. 29, 2022", U.S. Appl. No. 17/098,059, (32 pages).
"Final Office Action mailed on Mar. 10, 2023", U.S. Appl. No. 17/357,795, (15 pages).
"First Office Action mailed on Dec. 22, 2022 with English translation", Chinese Patent Application No. 201980061450.2, (11 pages).
"First Office Action mailed on Jan. 24, 2023 with English translation", Japanese Patent Application No. 2020-549034, (7 pages).
"First Office Action mailed on Sep. 16, 2022 with English translation", Chinese Patent Application No. 201980063642.7, (7 pages).
"Non Final Office Action mailed on Dec. 7, 2022", U.S. Appl. No. 17/357,795, (63 pages).
"Non Final Office Action mailed on Feb. 3, 2023", U.S. Appl. No. 17/429,100, (16 pages).
"Non Final Office Action mailed on Feb. 3, 2023", U.S. Appl. No. 17/497,965, (32 pages).
"Non Final Office Action mailed on Jan. 24, 2023", U.S. Appl. No. 17/497,940, (10 pages).
"Non Final Office Action mailed on Mar. 1, 2023", U.S. Appl. No. 18/046,739, (34 pages).
"Notice of Reason for Rejection mailed on Oct. 28, 2022 with English translation", Japanese Patent Application No. 2020-531452, (3 pages).
"Office Action mailed on Nov. 24, 2022 with English Translation", Japanese Patent Application No. 2020-533730, (11 pages).
"Extended European Search Report issued on Apr. 5, 2023", European Patent Application No. 20888716.6, (11 pages).
"First Office Action mailed Apr. 21, 2023 with English translation", Japanese Patent Application No. 2021-509779, (26 pages).
"First Office Action mailed on Mar. 27, 2023 with English translation", Japanese Patent Application No. 2020-566617, (6 pages).
"First Office Action mailed on Mar. 6, 2023 with English translation", Korean Patent Application No. 10-2020-7019685, (7 pages).
"Non Final Office Action mailed on Apr. 13, 2023", U.S. Appl. No. 17/098,043, (7 pages).
"Non Final Office Action mailed on May 11, 2023", U.S. Appl. No. 17/822,279, (24 pages).
"Office Action mailed on Mar. 30, 2023 with English translation", Japanese Patent Application No. 2020-566620, (10 bages).
"Second Office Action mailed on May 2, 2023 with English Translation", Japanese Patent Application No. 2020-549034, (6 pages).
Li, Yujia , et al., "Graph Matching Networks for Learning the Similarity of Graph Structured Objects", arxiv.org, Cornell University Library, 201 Olin Library Cornell University Ithaca, NY 14853, XP081268608, Apr. 29, 2019.
Luo, Zixin , et al., "ContextDesc: Local Descriptor Augmentation With Cross-Modality Context", 2019 IEEE/CVF Conference on Computer Vision and Pattern Recognition (CVPR), IEEE, XP033686823, DOI: 10.1109/CVPR.2019.00263 [retrieved on Jan. 8, 2020], Jun. 15, 2019, pp. 2522-2531.
Zhang, Zen , et al., "Deep Graphical Feature Learning for the Feature Matching Problem", 2019 IEEE/CVF International Conference on Computer Vision (ICCV), IEEE, XP033723985, DOI: 10.1109/ICCV.2019.00519 [retrieved on Feb. 24, 2020], Oct. 27, 2019, pp. 5086-5095.
"Communication Pursuant to Rule 164(1) EPC mailed on Feb. 23, 2022", European Patent Application No. 20753144.3, (11 pages).

(56) References Cited

OTHER PUBLICATIONS

"Extended European Search Report issued on Aug. 24, 2022", European Patent Application No. 20846338.0, (13 pages).
"Extended European Search Report issued on Aug. 8, 2022", European Patent Application No. 19898874.3, (8 pages).
"Extended European Search Report issued on Sep. 8, 2022", European Patent Application No. 20798769.4, (13 pages).
"First Examination Report Mailed on Jul. 28, 2022", Indian Patent Application No. 202047024232, (6 pages).
"FS_XR5G: Permanent document, v0.4.0", Qualcomm Incorporated, 3GPP TSG-SA 4 Meeting 103 retrieved from the Internet: URL:http://www.3gpp.org/ftp/Meetings%5F3GP P%5FSYNC/SA4/Docs/S4%2DI90526%2Ezip [retrieved on Apr. 12, 2019], Apr. 12, 2019, (98 pages).
"Non Final Office Action mailed on Sep. 19, 2022", U.S. Appl. No. 17/263,001, (14 pages).
"Second Office Action mailed on Jul. 13, 2022 with English Translation", Chinese Patent Application No. 201880079474.6, (10 pages).
"Second Office Action mailed on Jun. 20, 2022 with English Translation", Chinese Patent Application No. 201880089255.6, (14 pages).
Anonymous, "Koi Pond: Top iPhone App Store Paid App", https://web.archive.org/web/20080904061233/https://www.iphoneincanada.ca/reviews /koi-pond-top-iphone-app-store-paid-app/—[retrieved on Aug. 9, 2022], (2 pages).
Chittineni, C., et al., "Single filters for combined image geometric manipulation and enhancement", Proceedings of SPIE vol. 1903, Image and Video Processing, Apr. 8, 1993, San Jose, CA. (Year: 1993), pp. 111-121.
"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).
Communication Pursuant to Article 94(3) EPC, European Patent Application No. 16207441.3 , (4 pages).
Communication Pursuant to Article 94(3) EPC mailed on Sep. 4, 2019, European Patent Application No. 10793707.0 , (4 pages).
Communication Pursuant to Rule 164(1) EPC mailed on Jul. 27, 2021, European Patent Application No. 19833664.6 , (11 pages).
European Search Report mailed on Oct. 15, 2020, European Patent Application No. 20180623.9 , (10 pages).
Examination Report mailed on Jun. 19, 2020, European Patent Application No. 20154750.2, (10 pages).
Extended European Search Report issued on May 20, 2020, European Patent Application No. 20154070.5 , (7 pages).
Extended European Search Report issued on Jan. 22, 2021, European Patent Application No. 18890390.0 , (11 pages).
Extended European Search Report issued on Nov. 3, 2020, European Patent Application No. 18885707.2 , (7 pages).
Extended European Search Report issued on Jun. 30, 2021, European Patent Application No. 19811971.1 , (9 pages).
Extended European Search Report issued on Mar. 4, 2021, European Patent Application No. 19768418.6 , (9 pages).
Extended European Search Report issued on Nov. 4, 2020, European Patent Application No. 20190980.1 , (14 pages).
Extended European Search Report mailed on Jun. 12, 2017, European Patent Application No. 16207441.3 , (8 pages).
Extended European Search Report mailed on Jul. 16, 2021, European Patent Application No. 19810142.0 , (14 pages).
Extended European Search Report mailed on Jul. 30, 2021, European Patent Application No. 19839970.1 , (7 pages).
Extended European Search Report mailed on Oct. 27, 2021, European Patent Application No. 19833664.6, (10 pages).
Extended European Search Report mailed on Sep. 20, 2021, European Patent Application No. 19851373.1, (8 pages).
Extended European Search Report mailed on Sep. 28, 2021, European Patent Application No. 19845418.3, (13 pages).
Final Office Action mailed on Aug. 10, 2020, U.S. Appl. No. 16/225,961 , (13 pages).
Final Office Action mailed on Dec. 4, 2019, U.S. Appl. No. 15/564,517 , (15 pages).
Final Office Action mailed on Feb. 19, 2020, U.S. Appl. No. 15/552,897, (17 pages).
Final Office Action mailed on Jun. 15, 2021, U.S. Appl. No. 16/928,313, (42 pages).
Final Office Action mailed on Mar. 1, 2021, U.S. Appl. No. 16/214,575 , (29 pages).
Final Office Action mailed on Mar. 19, 2021, U.S. Appl. No. 16/530,776, (25 pages).
Final Office Action mailed on Nov. 24, 2020, U.S. Appl. No. 16/435,933, (44 pages).
Final Office Action mailed on Sep. 17, 2021, U.S. Appl. No. 16/938,782, (44 pages).
International Search Report and Written Opinion mailed on Feb. 12, 2021, International Application No. PCT/US20/60555, (25 pages).
International Search Report and Written Opinion mailed on Mar. 12, 2020, International PCT Patent Application No. PCT/US19/67919, (14 pages).
International Search Report and Written Opinion mailed on Aug. 15, 2019, International PCT Patent Application No. PCT/US19/33987, (20 pages).
International Search Report and Written Opinion mailed on Jun. 15, 2020, International PCT Patent Application No. PCT/US2020/017023, (13 pages).
International Search Report and Written Opinion mailed on Oct. 16, 2019, International PCT Patent Application No. PCT/US19/43097, (10 pages).
International Search Report and Written Opinion mailed on Oct. 16, 2019, International PCT Patent Application No. PCT/US19/36275, (10 pages).
International Search Report and Written Opinion mailed on Oct. 16, 2019, International PCT Patent Application No. PCT/US19/43099, (9 pages).
International Search Report and Written Opinion mailed on Jun. 17, 2016, International PCT Patent Application No. PCT/FI2016/050172, (9 pages).
International Search Report and Written Opinion mailed on Feb. 2, 2021, International PCT Patent Application No. PCT/US20/60550, (9 pages).
International Search Report and Written Opinion mailed on Oct. 22, 2019, International PCT Patent Application No. PCT/US19/43751, (9 pages).
International Search Report and Written Opinion mailed on Dec. 23, 2019, International PCT Patent Application No. PCT/US19/44953, (11 pages).
International Search Report and Written Opinion mailed on May 23, 2019, International PCT Patent Application No. PCT/US18/66514, (17 pages).
International Search Report and Written Opinion mailed on Sep. 26, 2019, International PCT Patent Application No. PCT/US19/40544, (12 pages).
International Search Report and Written Opinion mailed on Aug. 27, 2019, International PCT Application No. PCT/US2019/035245, (8 pages).
International Search Report and Written Opinion mailed on Dec. 27, 2019, International Application No. PCT/US19/47746, (16 pages).
International Search Report and Written Opinion mailed on Dec. 3, 2020, International Patent Application No. PCT/US20/43596, (25 pages).
International Search Report and Written Opinion mailed on Sep. 30, 2019, International Patent Application No. PCT/US19/40324, (7 pages).
International Search Report and Written Opinion mailed on Sep. 4, 2020, International Patent Application No. PCT/US20/31036, (13 pages).
International Search Report and Written Opinion mailed on Jun. 5, 2020, International Patent Application No. PCT/US20/19871, (9 pages).
International Search Report and Written Opinion mailed on Aug. 8, 2019, International PCT Patent Application No. PCT/US2019/034763, (8 pages).

(56) References Cited

OTHER PUBLICATIONS

International Search Report and Written Opinion mailed on Oct. 8, 2019, International PCT Patent Application No. PCT/US19/41151, (7 pages).
International Search Report and Written Opinion mailed on Jan. 9, 2020, International Application No. PCT/US19/55185, (10 pages).
International Search Report and Written Opinion mailed on Feb. 28, 2019, International Patent Application No. PCT/US18/64686, (8 pages).
International Search Report and Written Opinion mailed on Feb. 7, 2020, International PCT Patent Application No. PCT/US2019/061265, (11 pages).
International Search Report and Written Opinion mailed on Jun. 11, 2019, International PCT Application No. PCT/US19/22620, (7 pages).
Invitation to Pay Additional Fees mailed Aug. 15, 2019, International PCT Patent Application No. PCT/US19/36275, (2 pages).
Invitation to Pay Additional Fees mailed Sep. 24, 2020, International Patent Application No. PCT/US2020/043596, (3 pages).
Invitation to Pay Additional Fees mailed on Oct. 22, 2019, International PCT Patent Application No. PCT/US19/47746, (2 pages).
Invitation to Pay Additional Fees mailed on Apr. 3, 2020, International Patent Application No. PCT/US20/17023, (2 pages).
Invitation to Pay Additional Fees mailed on Oct. 17, 2019, International PCT Patent Application No. PCT/US19/44953, (2 pages).
Non Final Office Action mailed on Aug. 21, 2019, U.S. Appl. No. 15/564,517, (14 pages).
Non Final Office Action mailed on Aug. 4, 2021, U.S. Appl. No. 16/864,721, (51 pages).
Non Final Office Action mailed on Jan. 26, 2021, U.S. Appl. No. 16/928,313, (33 pages).
Non Final Office Action mailed on Jan. 27, 2021, U.S. Appl. No. 16/225,961, (15 pages).
Non Final Office Action mailed on Jul. 27, 2020, U.S. Appl. No. 16/435,933, (16 pages).
Non Final Office Action mailed on Jul. 9, 2021, U.S. Appl. No. 17/002,663, (43 pages).
Non Final Office Action mailed on Jul. 9, 2021, U.S. Appl. No. 16/833,093, (47 pages).
Non Final Office Action mailed on Jun. 10, 2021, U.S. Appl. No. 16/938,782, (40 Pages).
Non Final Office Action mailed on Jun. 17, 2020, U.S. Appl. No. 16/682,911, (22 pages).
Non Final Office Action mailed on Jun. 19, 2020, U.S. Appl. No. 16/225,961, (35 pages).
Non Final Office Action mailed on Jun. 29, 2021, U.S. Appl. No. 16/698,588, (58 pages).
Non Final Office Action mailed on Mar. 3, 2021, U.S. Appl. No. 16/427,337, (41 pages).
Non Final Office Action mailed on May 26, 2021, U.S. Appl. No. 16/214,575, (19 pages).
Non Final Office Action mailed on Nov. 19, 2019, U.S. Appl. No. 16/355,611, (31 pages).
Non Final Office Action mailed on Nov. 5, 2020, U.S. Appl. No. 16/530,776, (45 pages).
Non Final Office Action mailed on Oct. 22, 2019, U.S. Appl. No. 15/859,277, (15 pages).
Non Final Office Action mailed on Sep. 1, 2020, U.S. Appl. No. 16/214,575, (40 pages).
Non Final Office Action mailed on Sep. 20, 2021, U.S. Appl. No. 17/105,848, (56 pages).
Non Final Office Action mailed on Sep. 29, 2021, U.S. Appl. No. 16/748,193, (62 pages).
Notice of Allowance mailed on Mar. 25, 2020, U.S. Appl. No. 15/564,517, (11 pages).
Notice of Allowance mailed on Oct. 5, 2020, U.S. Appl. No. 16/682,911, (27 pages).
Notice of Reason of Refusal mailed on Sep. 11, 2020 with English translation, Japanese Patent Application No. 2019-140435, (6 pages).

"Phototourism Challenge", CVPR 2019 Image Matching Workshop. https://image matching-workshop. github.io., (16 pages).
Summons to attend oral proceedings pursuant to Rule 115(1) EPC mailed on Jul. 15, 2019, European Patent Application No. 15162521.7, (7 pages).
Aarik, J., et al., "Effect of crystal structure on optical properties of TiO2 films grown by atomic layer deposition", Thin Solid Films; Publication [online]. May 19, 1998 [retrieved Feb. 19, 2020]. Retrieved from the Internet: <URL: https://www.sciencedirect.com/science/article/pii/S0040609097001351?via%3Dihub>; DOI: 10.1016/S0040-6090(97)00135-1; see entire document, (2 pages).
Altwaijry, et al., "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021)] < URL: http://www.bmva.org/bmvc/2016/papers/paper049/index.html >, en lire document, especially Abstract.
Arandjelović, Relja, et al., "Three things everyone should know to improve object retrieval", CVPR, 2012, (8 pages).
Azom, "Silica-Silicon Dioxide (SiO2)", AZO Materials; Publication [Online]. Dec. 13, 2001 [retrieved Feb. 19, 2020]. Retrieved from the Internet: <URL: https://www.azom.com/article.aspx?ArticleID=1114>.
Azuma, Ronald T., "A Survey of Augmented Reality", Presence: Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).
Azuma, Ronald T., "Predictive Tracking for Augmented Reality", Department of Computer Science, Chapel Hill NC; TR95-007, Feb. 1995, 262 pages.
Battaglia, Peter W, et al., "Relational inductive biases, deep learning, and graph networks", arXiv:1806.01261, Oct. 17, 2018, pp. 1-40.
Berg, Alexander C, et al., "Shape matching and object recognition using low distortion correspondences", In CVPR, 2005, (8 pages).
Bian, Jiawang, et al., "GMS: Grid-based motion statistics for fast, ultra-robust feature correspondence.", In CVPR (Conference on Computer Vision and Pattern Recognition), 2017, (10 pages).
Bimber, Oliver, et al., "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007), (393 pages).
Brachmann, Eric, et al., "Neural-Guided RANSAC: Learning Where to Sample Model Hypotheses", In ICCV (International Conference on Computer Vision ), arXiv:1905.04132v2 [cs.CV] Jul. 31, 2019, (17 pages).
Butail, et al., "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http://lcdcl.umd.edu/papers/icra2012.pdf> entire document.
Caetano, Tibério S, et al., "Learning graph matching", IEEE TPAMI, 31(6):1048-1058, 2009.
Cech, Jan, et al., "Efficient sequential correspondence selection by cosegmentation", IEEE TPAMI, 32(9):1568-1581, Sep. 2010.
Cuturi, Marco, "Sinkhorn distances: Lightspeed computation of optimal transport", NIPS, 2013, (9 pages).
Dai, Angela, et al., "ScanNet: Richly-annotated 3d reconstructions of indoor scenes", In CVPR, arXiv:1702.04405v2 [cs.CV] Apr. 11, 2017, (22 pages).
Deng, Haowen, et al., "PPFnet: Global context aware local features for robust 3d point matching", In CVPR, arXiv:1802.02669v2 [cs.CV] Mar. 1, 2018, (12 pages).
Detone, Daniel, et al., "Deep image homography estimation", In RSS Work-shop: Limits and Potentials of Deep Learning in Robotics, arXiv:1606.03798v1 [cs.CV] Jun. 13, 2016, (6 pages).
Detone, Daniel, et al., "Self-improving visual odometry", arXiv:1812.03245, Dec. 8, 2018, (9 pages).
Detone, Daniel, et al., "SuperPoint: Self-supervised interest point detection and description", In CVPR Workshop on Deep Learning for Visual SLAM, arXiv:1712.07629v4 [cs.CV] Apr. 19, 2018, (13 pages).

(56) References Cited

OTHER PUBLICATIONS

Dusmanu, Mihai, et al., "D2-net: A trainable CNN for joint detection and description of local features", CVPR, arXiv:1905.03561v1 [cs.CV] May 9, 2019, (16 pages).
Ebel, Patrick, et al., "Beyond cartesian representations for local descriptors", ICCV, arXiv:1908.05547v1 [cs.CV] Aug. 15, 2019, (11 pages).
Fischler, Martin A, et al., "Random sample consensus: a paradigm for model fitting with applications to image analysis and automated cartography", Communications of the ACM, 24(6): 1981, pp. 381-395.
Gilmer, Justin, et al., "Neural message passing for quantum chemistry", In ICML, arXiv:1704.01212v2 [cs.LG] Jun. 12, 2017, (14 pages).
Giuseppe, Donato, et al., "Stereoscopic helmet mounted system for real time 3D environment reconstruction and indoor ego—motion estimation", Proc. SPIE 6955, Head- and Helmet-Mounted Displays XIII: Design and Applications, 69550P.
Goodfellow, "Titanium Dioxide-Titania (TiO2)", AZO Materials; Publication [online]. Jan. 11, 2002 [retrieved Feb. 19, 2020]. Retrieved from the Internet: <URL: https://www.azom.com/article.aspx?Article1D=1179>.
Hartley, Richard, et al., "Multiple View Geometry in Computer Vision", Cambridge University Press, 2003, pp. 1-673.
Jacob, Robert J.K., "Eye Tracking in Advanced Interface Design", Human-Computer Interaction Lab, Naval Research Laboratory, Washington, D.C., date unknown. 2003, pp. 1-50.
Lee, et al., "Self-Attention Graph Pooling", Cornell University Library/Computer Science/Machine Learning, Apr. 17, 2019 [retrieved on Jan. 8, 2021 from the Internet< URL: https://arxiv.org/abs/1904.08082 >, entire document.
Lee, Juho, et al., "Set transformer: A frame-work for attention-based permutation-invariant neural networks", ICML, arXiv:1810.00825v3 [cs.LG] May 26, 2019, (17 pages).
Leordeanu, Marius, et al., "A spectral technique for correspondence problems using pairwise constraints", Proceedings of (ICCV) International Conference on Computer Vision, vol. 2, pp. 1482-1489, Oct. 2005, (8 pages).
Levola, T., "Diffractive Optics for Virtual Reality Displays", Journal of the SID Eurodisplay 14/05, 2005, XP008093627, chapters 2-3, Figures 2 and 10, pp. 467-475.
Levola, Tapani, "Invited Paper: Novel Diffractive Optical Components for Near to Eye Displays—Nokia Research Center", SID 2006 Digest, 2006 SID International Symposium, Society for Information Display, vol. XXXVII, May 24, 2005, chapters 1-3, figures 1 and 3, pp. 64-67.
Li, Yujia, et al., "Graph matching networks for learning the similarity of graph structured objects", ICML, arXiv:1904.12787v2 [cs.LG] May 12, 2019, (18 pages).
Li, Zhengqi, et al., "Megadepth: Learning single-view depth prediction from internet photos", In CVPR, fromarXiv: 1804.00607v4 [cs.CV] Nov. 28, 2018, (10 pages).
Libovicky, et al., "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021 ) from < URL: https://doi.org/10.18653/v1/V18-64026 >, entire document.
Loiola, Eliane Maria, et al., "A survey for the quadratic assignment problem", European journal of operational research, 176(2): 2007, pp. 657-690.
Lowe, David G, "Distinctive image features from scale-invariant keypoints", International Journal of Computer Vision, 60(2): 91-110, 2004, (28 pages).
Luo, Zixin, et al., "ContextDesc: Local descriptor augmentation with cross-modality context", CVPR, arXiv:1904.04084v1 [cs.CV] Apr. 8, 2019, (14 pages).
Memon, F., et al., "Synthesis, Characterization and Optical Constants of Silicon Oxycarbide", EPJ Web of Conferences; Publication [online]. Mar. 23, 2017 [retrieved Feb. 19, 2020).<URL: https://www.epj-conferences.org/articles/epjconf/pdf/2017/08/epjconf_nanop2017 _00002.pdf>; DOI: 10.1051/epjconf/201713900002, (8 pages).
Molchanov, Pavlo, et al., "Short-range FMCW monopulse radar for hand-gesture sensing", 2015 IEEE Radar Conference (RadarCon) (2015), pp. 1491-1496.
Munkres, James, "Algorithms for the assignment and transportation problems", Journal of the Society for Industrial and Applied Mathematics, 5(1): 1957, pp. 32-38.
Ono, Yuki, et al., "LF-Net: Learning local features from images", 32nd Conference on Neural Information Processing Systems (NIPS 2018), arXiv:1805.09662v2 [cs.CV] Nov. 22, 2018, (13 pages).
Paszke, Adam, et al., "Automatic differentiation in Pytorch", 31st Conference on Neural Information Processing Systems (NIPS 2017), Long Beach, CA, USA, (4 pages).
Peyré, Gabriel, et al., "Computational Optimal Transport", Foundations and Trends in Machine Learning, 11(5-6):355-607, 2019; arXiv:1803.00567v4 [stat.ML] Mar. 18, 2020, (209 pages).
Qi, Charles Ruizhongtai, et al., "Pointnet++: Deep hierarchical feature learning on point sets in a metric space.", 31st Conference on Neural Information Processing Systems (NIPS 2017), Long Beach, CA, USA., (10 pages).
Qi, Charles R, et al., "Pointnet: Deep Learning on Point Sets for 3D Classification and Segmentation", CVPR, arXiv:1612.00593v2 [cs.CV] Apr. 2, 1001, (19 pages).
Radenović, Filip, et al., "Revisiting Oxford and Paris: Large-Scale Image Retrieval Benchmarking", CVPR, arXiv:1803.11285v1 [cs.CV] Mar. 29, 2018, (10 pages).
Raguram, Rahul, et al., "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).
Ranftl, René, et al., "Deep fundamental matrix estimation", European Conference on Computer Vision (ECCV), 2018, (17 pages).
Revaud, Jerome, et al., "R2D2: Repeatable and Reliable Detector and Descriptor", In NeurIPS, arXiv:1906.06195v2 [cs.CV] Jun. 17, 2019, (12 pages).
Rocco, Ignacio, et al., "Neighbourhood Consensus Networks", 32nd Conference on Neural Information Processing Systems (NeurIPS 2018), Montreal, Canada, arXiv:1810.10510v2 [cs.CV] Nov. 29, 2018, (20 pages).
Rublee, Ethan, et al., "ORB: An efficient alternative to SIFT or SURF", Proceedings of the IEEE International Conference on Computer Vision. 2564-2571. 2011; 10.1109/ICCV.2011.612654, (9 pages).
Sarlin, et al., "SuperGlue: Learning Feature Matching with Graph Neural Networks", Cornell University Library/Computer Science/ Computer Vision and Pattern Recognition, Nov. 26, 2019 [retrieved on Jan. 8, 2021 from the Internet< URL: https://arxiv.org/abs/1911.11763 >, entire document.
Sattler, Torsten, et al., "SCRAMSAC: Improving RANSAC's efficiency with a spatial consistency filter", ICCV, 2009: 2090-2097., (8 pages).
Schonberger, Johannes Lutz, et al., "Pixelwise view selection for un-structured multi-view stereo", Computer Vision—ECCV 2016: 14th European Conference, Amsterdam, The Netherlands, Oct. 11-14, 2016, Proceedings, Part III, pp. 501-518, 2016.
Schonberger, Johannes Lutz, et al., "Structure-from-motion revisited", Proceedings of the IEEE Conference on Computer Vision and Pattern Recognition (CVPR), 2016, pp. 4104-4113, (11 pages).
Sheng, Liu, et al., "Time-multiplexed dual-focal plane head-mounted display with a liquid lens", Optics Letters, Optical Society of Amer I Ca, US, vol. 34, No. 11, Jun. 1, 2009 (Jun. 1, 2009), XP001524475, ISSN: 0146-9592, pp. 1642-1644.
Sinkhorn, Richard, et al., "Concerning nonnegative matrices and doubly stochastic matrices.", Pacific Journal of Mathematics, 1967, pp. 343-348.

(56) References Cited

OTHER PUBLICATIONS

Spencer, T., et al., "Decomposition of poly(propylene carbonate) with UV sensitive iodonium 11 salts", Polymer Degradation and Stability; (online]. Dec. 24, 2010 (retrieved Feb. 19, 2020]., (17 pages).
Tanriverdi, Vildan, et al., "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.
Thomee, Bart, et al., "YFCC100m: The new data in multimedia research" Communications of the ACM, 59(2):64-73, 2016; arXiv:1503. 01817v2 [cs.MM] Apr. 25, 2016, (8 pages).
Torresani, Lorenzo, et al., "Feature correspondence via graph matching: Models and global optimization", Computer Vision— ECCV 2008, 10th European Conference on Computer Vision, Marseille, France, Oct. 12-18, 2008, Proceedings, Part II, (15 pages).
Tuytelaars, Tinne, et al., "Wide baseline stereo matching based on local, affinely invariant regions", BMVC, 2000, pp. 1-14.
Ulyanov, Dmitry, et al., "Instance normalization: The missing ingredient for fast stylization", arXiv:1607.08022v3 [cs.CV] Nov. 6, 2017, (6 pages).
Vaswani, Ashish, et al., "Attention is all you need", 31st Conference on Neural Information Processing Systems (NIPS 2017), Long Beach, CA, USA; arXiv:1706.03762v5 [cs.CL] Dec. 6, 2017, (15 pages).
Veličkovič, Petar, et al., "Graph attention networks", ICLR, arXiv:1710.10903v3 [stat.ML] Feb. 4, 2018, (12 pages).
Villani, Cédric, "Optimal transport: old and new", vol. 338. Springer Science & Business Media, Jun. 2008, pp. 1-998.
Wang, Xiaolong, et al., "Non-local neural networks", CVPR, arXiv:1711.07971v3 [cs.CV] Apr. 13, 2018, (10 pages).
Wang, Yue, et al., "Deep Closest Point: Learning representations for point cloud registration", ICCV, arXiv:1905.03304v1 [cs.CV] May 8, 2019, (10 pages).
Wang, Yue, et al., "Dynamic Graph CNN for learning on point clouds", ACM Transactions on Graphics, arXiv:1801.07829v2 [cs.CV] Jun. 11, 2019, (13 pages).
Weissel, et al., "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>.
Yi, Kwang Moo, et al., "Learning to find good correspondences", CVPR, arXiv:1711.05971v2 [cs.CV] May 21, 2018, (13 pages).
Yi, Kwang Moo, et al., "Lift: Learned invariant feature transform", ECCV, arXiv:1603.09114v2 [cs.CV] Jul. 29, 2016, (16 pages).
Zaheer, Manzil, et al., "Deep Sets", 31st Conference on Neural Information Processing Systems (NIPS 2017), Long Beach, CA, USA; arXiv:1703.06114v3 [cs.LG] Apr. 14, 2018, (29 pages).
Zhang, Jiahui, et al., "Learning two-view correspondences and geometry using order-aware network", ICCV; aarXiv:1908. 04964v1 [cs.CV] Aug. 14, 2019, (11 pages).
Zhang, Li, et al., "Dual graph convolutional net-work for semantic segmentation", BMVC, 2019; arXiv:1909.06121v3 [cs.CV] Aug. 26, 2020, (18 pages).
"Communication Pursuant to Article 94(3) EPC mailed on Feb. 28, 2023", European Patent Application No. 19845418.3, (6 Pages).
"Communication Pursuant to Article 94(3) EPC mailed on Jul. 28, 2023", European Patent Application No. 19843487.0, (15 pages).
"Communication Pursuant to Article 94(3) EPC mailed on May 23, 2023", European Patent Application No. 18890390.0, (5 pages).
"Communication Pursuant to Article 94(3) EPC mailed on Oct. 6, 2023", European Patent Application No. 19851373.1, (6 pages).
"Extended European Search Report issued on Jan. 8, 2024", European Patent Application No. 23195266.4, (8 pages).
"Final Office Action mailed Oct. 16, 2023", U.S. Appl. No. 17/098,043, (7 pages).

"Final Office Action mailed on Dec. 1, 2023", U.S. Appl. No. 17/357,795, (18 pages).
"Final Office Action mailed on Sep. 8, 2023 with English translation", Japanese Patent Application No. 2020-566620, (18 pages).
"First Examination Report Mailed on Aug. 8, 2023", Australian Patent Application No. 2018379105, (3 pages).
"First Office Action mailed Dec. 12, 2023 with English translation", Japanese Patent Application No. 2021-545712, (8 pages).
"First Office Action mailed Jul. 4, 2023 with English translation", Japanese Patent Application No. 2021-505669, (6 pages).
"First Office Action mailed Nov. 2, 2023 with English translation", Chinese Patent Application No. 201980090867.1, (16 pages).
"First Office Action mailed on Apr. 13, 2023 with English Translation", Japanese Patent Application No. 2020-567766, (7 pages).
"First Office Action mailed on Jun. 13, 2023 with English translation", Japanese Patent Application No. 2020-567853, (7 pages).
"First Office Action mailed on May 26, 2023 with English translation", Japanese Patent Application No. 2021-500607, (6 pages).
"First Office Action mailed on May 30, 2023 with English translation", Japanese Patent Application No. 2021-519873, (8 pages).
"First Office Action mailed Sep. 29, 2023 with English translation", Japanese Patent Application No. 2023-10887, (5 pages).
"Non Final Office Action mailed Nov. 19, 2019", U.S. Appl. No. 16/355,611, (31 pages).
"Non Final Office Action mailed on Aug. 2, 2023", U.S. Appl. No. 17/807,600, (25 pages).
"Non Final Office Action mailed on Jul. 20, 2023", U.S. Appl. No. 17/650,188, (11 pages).
"Non Final Office Action mailed on Jun. 14, 2023", U.S. Appl. No. 17/516,483, (10 pages).
"Non Final Office Action mailed on Nov. 22, 2023", U.S. Appl. No. 17/268,376, (8 pages).
"Non Final Office Action mailed on Oct. 11, 2023", U.S. Appl. No. 18/151,763 (14 pages).
"Non Final Office Action mailed on Oct. 24, 2023", U.S. Appl. No. 17/259,020, (21 pages).
"Notice of Allowance mailed on Jul. 27, 2023 with English translation", Korean Patent Application No. 10-2020-7019685, (4 pages).
"Office Action mailed Nov. 21, 2023 with English Translation", Japanese Patent Application No. 2021-535716, (15 pages).
"Office Action mailed on Dec. 14, 2023 with English translation", Japanese Patent Application No. 2021-526564, (13 pages).
"Office Action mailed on Jul. 20, 2023 with English translation", Japanese Patent Application No. 2021-505884, (6 pages).
"Office Action mailed on Jun. 8, 2023 with English translation", Japanese Patent Application No. 2021-503762, (6 pages).
"Office Action mailed on Nov. 7, 2023 with English translation", Korean Patent Application No. 10-2023-7036734, (5 pages).
"Office Action mailed on Nov. 8, 2023 with English translation", Chinese Patent Application No. 201980060018.1, (12 pages).
"Penultimate Office Action mailed on Oct. 19, 2023 with English translation", Japanese Patent Application No. 2021-509779, (5 pages).
"Second Office Action mailed on Sep. 25, 2023 with English translation", Japanese Patent Application No. 2020-567853, (8 pages).
"Wikipedia Dioptre", Jun. 22, 2018 (Jun. 22, 2018), XP093066995, Retrieved from the Internet: URL:https://en.wikipedia.org/w/index.php?title=Dioptre&direction=next&oldid=846451540 [retrieved on Jul. 25, 2023], (3 pages).
"Communication Pursuant to Article 94(3) EPC mailed on Feb. 21, 2024", European Patent Application No. 20770244.0, (8 pages).
"Communication Pursuant to Article 94(3) EPC mailed on Mar. 11, 2024", European Patent Application No. 20798769.4, (12 pages).
"Extended European Search Report issued on Apr. 25, 2024", European Patent Application No. 23208907.8, (9 pages).
"First Office Action mailed Mar. 1, 2024 with English translation", Japanese Patent Application No. 2021-553297, (5 pages).
"Non Final Office Action mailed on Feb. 26, 2024", U.S. Appl. No. 18/046,739, (48 pages).
"Office Action mailed on Feb. 19, 2024 with English translation", Korean Patent Application No. 10-2020-7020552, (18 pages).

(56) References Cited

OTHER PUBLICATIONS

"Office Action mailed on Feb. 26, 2024 with English translation", Chinese Patent Application No. 201980069194.1, (11 pages).
"Office Action mailed on Mar. 6, 2024 with English translation", Chinese Patent Application No. 201980053016.X, (7 pages).
"Final Office Action mailed on May 24, 2024", U.S. Appl. No. 18/046,739, (52 pages).
"First Office Action mailed Mar. 20, 2024 with English translation", Chinese Patent Application No. 202080048293.4, (22 pages).
"First Office Action mailed on Mar. 25, 2024 with English translation", Chinese Patent Application No. 202080018919.7, (21 pages).
"Non Final Office Action mailed on May 16, 2024", U.S. Appl. No. 18/361,546, (11 pages).

* cited by examiner

High-Index only

High-Index With Low-Index

High-Index Stack With Air Pocket

High-Index Stack With Air Pocket

AIR POCKET STRUCTURES FOR PROMOTING TOTAL INTERNAL REFLECTION IN A WAVEGUIDE

CROSS-REFERENCE TO RELATED APPLICATIONS

This application is a National Phase of International Application No. PCT/US2019/067919, filed on Dec. 20, 2019, which claims priority from U.S. Provisional Patent Application No. 62/783,778, filed on Dec. 21, 2018, all of which are incorporated herein by reference in their entirety.

BACKGROUND OF THE INVENTION

1). Field of the Invention

This invention relates generally to an optical system and to a method of manufacturing an optical system.

2). Discussion of Related Art

Modern computing and display technologies have facilitated the development of so called "augmented reality" viewing devices. Such a viewing device usually has a frame that is mountable to a head of a user and frequently include two waveguides, one in front of each eye of a viewer. The waveguides are transparent so that ambient light from objects can transmit through the waveguides and the user can see the objects. Each waveguide also serves to transmit projected light from a projector to a respective eye of the user. The projected light forms an image on the retina of the eye. The retina of the eye thus receives the ambient light and the projected light. The user simultaneously sees real objects and an image that is created by the projected light.

The projected light usually enters the waveguide on an edge of the waveguide, then reflects within the waveguide and then exits the waveguide through a pupil of the waveguide towards the eye of the user. Total internal reflection (TIR) is an ideal situation where there are no losses of the projected light out of the waveguide and 100 percent of the projected light reaches the eye of the user.

SUMMARY OF THE INVENTION

The invention provides a method of manufacturing an optical system including securing a cap layer of a select transparent material to a waveguide of a high-index transparent material having front and rear sides, a cavity being defined between the cap layer and the waveguide with an optical gas in the cavity, such that, if a source of ambient light is located on the front side of the waveguide, a beam of the ambient light transmits in the select transparent material of the cap layer, in the cavity holding the optical gas and in the high-index transparent material of the waveguide.

The invention also provides an optical system including a waveguide of a high-index transparent material having front and rear sides, a cap layer of a select transparent material secured to the waveguide, a cavity being defined between the cap layer and the waveguide and an optical gas in the cavity, such that, if a source of ambient light is located on the front side of the waveguide, a beam of the ambient light transmits in the select transparent material of the cap layer, in the cavity holding the optical gas and in the high-index transparent material of the waveguide

BRIEF DESCRIPTION OF THE DRAWINGS

The invention is further described by way of examples with reference to the accompanying drawings, wherein.

DETAILED DESCRIPTION OF THE INVENTION

An optical system is described and a method for making the optical system.

Recesses are formed on a front side and a rear side of a waveguide. A solid porogen material is spun onto the front side and the rear side and fills the recesses. First front and rear cap layers are then formed on raised formations of the waveguide and on the solid porogen material. The entire structure is then heated and the solid porogen material decomposes to a porogen gas. The first front and rear cap layers are porous to allow the porogen gas to escape and air to enter into the recesses. The air maximizes a difference in refractive indices between the high-index transparent material of the waveguide and the air to promote reflection in the waveguide from interfaces between the waveguide and the air. Second front and rear cap layers are formed on the first front and rear cap layers, respectively and further front and rear cap layers are then formed on the second front and rear cap layers. The cap layers have indices of refraction that promote absorption of ambient light through the cap layers and into the waveguide.

FIGS. 1A to 1F illustrate a method of manufacturing an optical system according to an embodiment of the invention.

Figure 1A:
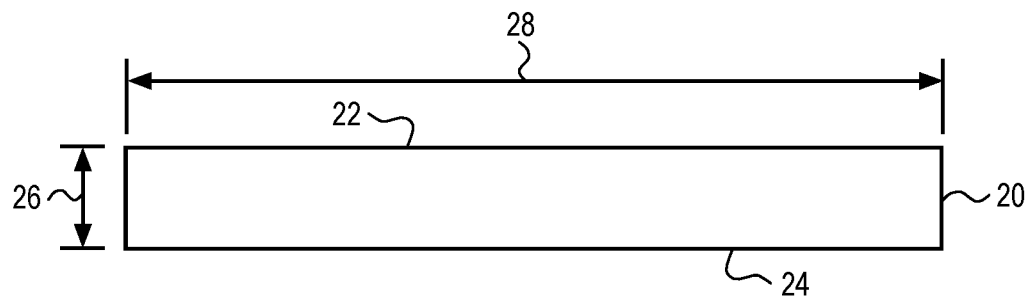
FIG. 1A is a cross-sectional side-view of a waveguide of a high-index transparent material.

FIG. 1A illustrates a waveguide 20 that serves as a primary substrate for subsequent fabrication. The waveguide 20 is made of a high-index transparent material. It is generally contemplated that the index of refraction of the waveguide 20 be at least 1.5. In the present embodiment, the waveguide 20 is made of high-index glass having an index of refraction of 1.73. In another embodiment, a waveguide may be made of lithium niobate, lithium tantalite or silicon carbide having an index of refraction of more than 2.0. A high-index transparent material is preferred because it maximizes field-of-view in the final product.

The waveguide 20 has front and rear sides 22 and 24. The front and rear sides 22 and 24 are spaced from one another by a thickness 26 of less than 3 mm. The front and rear sides 22 and 24 each have a width 28 of between 50 and 70 mm and a depth into the paper of between 50 and 70 mm. The front and rear sides 22 and 24 are planar surfaces that are in parallel planes to one another. The material of the waveguide 20 is sufficiently soft to allow for the front and rear sides 22 and 24 to be formed at room temperature of 22° C. or at a moderately high temperature of 50° C. without the formation of microcracks or optical distortions within the material of the waveguide 20.

Figure 1B:
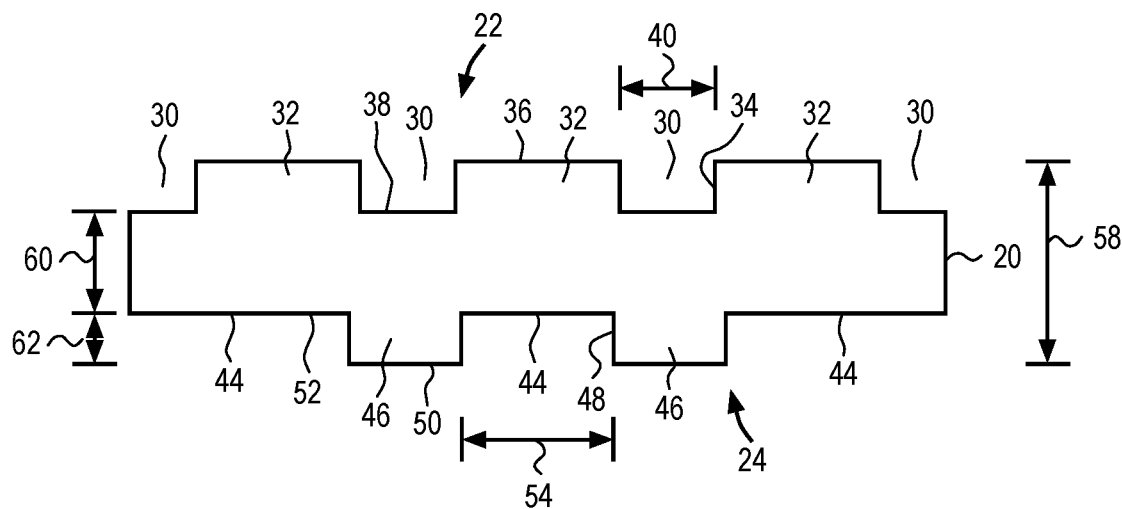
FIG. 1B is a view similar to FIG. 1A after the waveguide has been patterned to have a plurality of recesses and raised formations on a front side and a rear side.

FIG. 1B illustrates the waveguide 20 after the front and rear sides 22 and 24 have been shaped. The front side 22 is shaped to have a plurality of recesses 30 and a plurality of raised formations 32, with each raised formation 32 being located between two of the recesses 30. Side walls 34 of the recesses 30 form side walls of the raised formations 32. The raised formations 32 have outer surfaces 36 that are in the same plane. The recesses 30 have trench surfaces 38 that are in the same plane and parallel to the plane of the outer surfaces 36. Each recess 30 has a width 40 that is between 10 nm and 500 nm. The rear side 24 is shaped to have a plurality of recesses 44 and a plurality of raised formations 46, with each raised formation 46 being located between two of the recesses 44. Side walls 48 of the recesses 44 form side walls of the raised formations 46. The raised formations 46 have outer surfaces 50 that are in the same plane. The recesses 44 have trench surfaces 52 that are in the same plane that is parallel to the plane of the outer surfaces 50. Each recess 44 has a width 54 that is between 10 nm and 500 nm.

The front and rear sides 22 and 24 are simultaneously shaped with a tool that imprints the recesses 30 and 44 and the raised formations 32 and 46. The tool has front and rear parts that are made of hardened metal. The front part has a shape that is complementary to the profile that is created on the front side 22 and the rear part has a shape that is complementary to the shape that is created on the rear side 24. The waveguide 20 is inserted between the front and rear parts and an actuator is used to move the front and rear parts towards one another while the surfaces of the parts impart pressure on the front and rear sides 22 and 24 of the waveguide 20. The waveguide 20 is then removed from the tool. The front and rear sides 22 and 24 are then etched. The etching process removes microscopic artifacts from the trench surfaces 38 and 52 and planarizes the trench surfaces 38 and 52.

A thickness 58 of the waveguide 20 as measured between the outer surfaces 36 and 50 is more than the thickness 26 of the substrate in FIG. 1A and a thickness 60 as measured between the trench surfaces 38 and 52 is less than the thickness 26. The waveguide 20 has a thickness of between 200 microns and 1 nm. Each recess 30 or 44 has a depth 62 of between 10 nm and 500 nm.

Figure 1C:
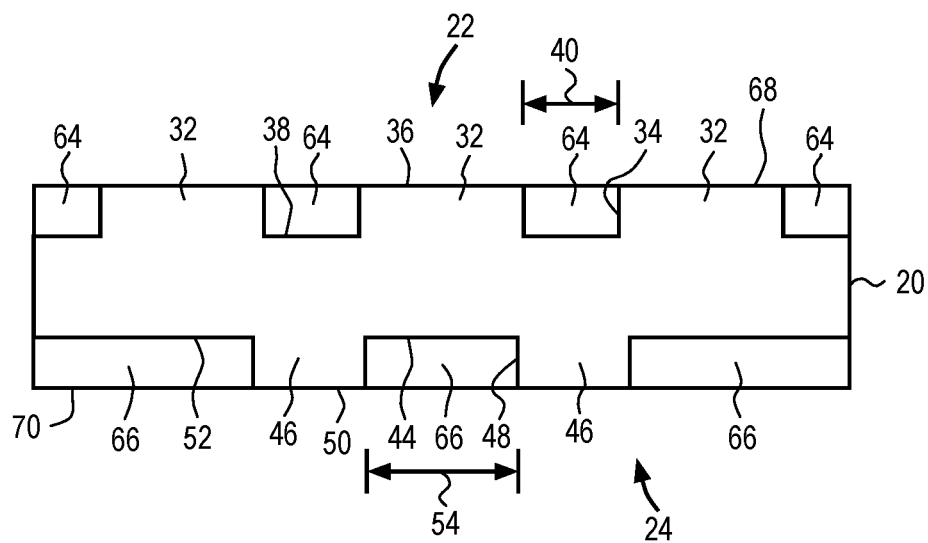
FIG. 1C is view similar to FIG. 1B after the recesses are filled with a solid porogen material in spinning process.

FIG. 1C illustrates the waveguide 20 after a porogen (sacrificial) material is deposited. The porogen material may be spin coated on the front side 22 and the rear side 24 of the waveguide 20. The porogen material fills the recesses 30 and 44. The porogen material forms a plurality of separated porogen portions 64 within the recesses 30 on the front side 22 and a plurality of separated porogen portions 66 within the recesses 44 on the rear side 24. Each porogen portion 64 fills a respective recess 30 until an outer surface 68 of the porogen portion 64 is coplanar with the outer surfaces 36 of the raised formations 32. The porogen portions 66 fill the recesses 44 until outer surfaces 70 of the porogen portions 66 are coplanar with the outer surfaces 50 of the raised formations 46.

Figure 1D:
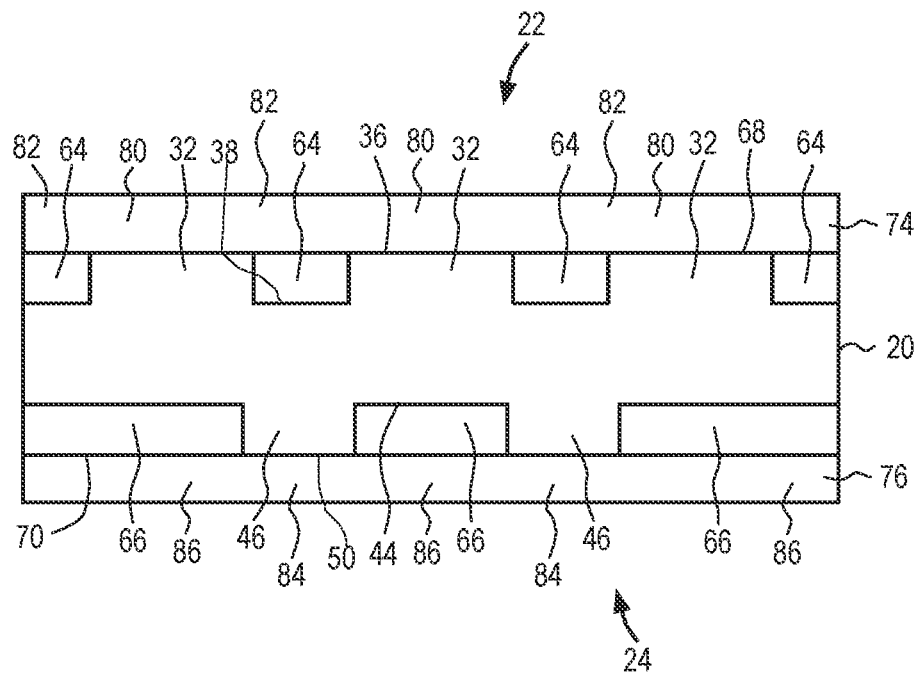
FIG. 1D is a view similar to FIG. 1C after a first front cap layer is formed on the front side and a first rear cap layer is formed on the rear side.

FIG. 1D illustrates the structure of FIG. 1C after a first front cap layer 74 and a first rear cap layer 76 are formed. The cap layers 74 and 76 may, for example, be formed in a chemical vapor deposition process.

The first front cap layer 74 is made of a select solid transparent material. The first front cap layer 74 is formed directly on the outer surfaces 36 of the raised formations 32 and the outer surfaces 68 of the porogen portions 64. The first front cap layer 74 also adheres to the outer surfaces 36 of the raised formations 32 and is thus secured to the waveguide 20.

The first front cap layer 74 is shown as finally fabricated and is made of a relatively strong solid material. However, the first front cap layer 74 is initially a thin and unstable film during its manufacture. Such a thin film is fragile and would collapse in the absence of the support provided by the solid material of the porogen portions 64. The first front cap layer 74 becomes more stable as it grows thicker and is eventually thick enough so that it does not rely on the support provided by the porogen portions 64 for its structural integrity. The first front cap layer 74 has a plurality of first portions 80 that are formed on the raised formations 32 and a plurality of second portions 82 that are formed on the porogen portions 64.

Similarly, the first rear cap layer 76 relies on the solid material of the porogen portions 66 for support during its initial fabrication but does not require the support of the porogen portions 66 after it has been finally fabricated and has obtained a thickness that is suitable to support itself without requiring the porogen portions 66. The first rear cap layer 76 has a plurality of first portions 84 that are formed on the raised formations 46 and a plurality of second portions 86 that are formed on the porogen portions 66.

Figure 1E:
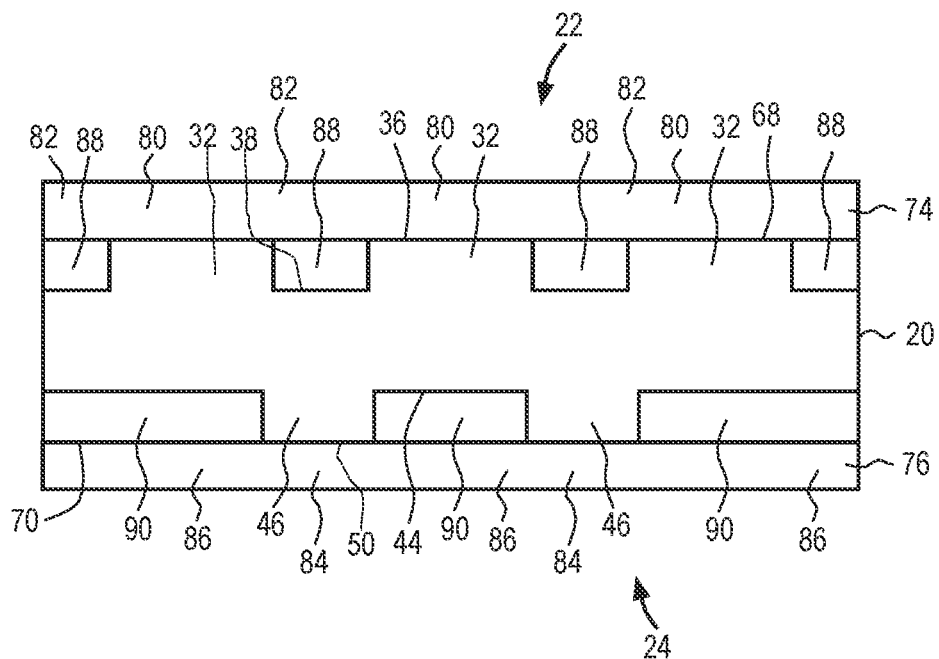
FIG. 1E is view similar to FIG. 1D after the structure is heated to remove the solid porogen material and replace the solid porogen material with air.

FIG. 1E illustrates the structure of FIG. 1D after the porogen portions 64 and 66 are removed to leave respective cavities 88 and 90. Each cavity 88 and 90 has the same dimensions as a respective porogen portion that has been removed. Each cavity 88 and 90 is filled with an optical gas in the form of air.

The solid porogen material of the porogen portions 64 and 66 is a thermally decomposable material or a material mixture that can be decomposed at a temperature that does not cause damage to the waveguide 20, the first front cap layer 74 or the first rear cap layer 76. The entire structure of FIG. 1D is heated to the decomposition temperature, which causes the solid porogen material to be converted to a porogen gas. The material of the first front cap layer 74 and the first rear cap layer 76 is sufficiently porous to allow the porogen gas to penetrate through the first front cap layer 74 and the first rear cap layer 76 so that the porogen gas leaves the cavities 88 and 90, and for air to penetrate through the first front cap layer 74 and the first rear cap layer 76 into the cavities 88 and 90. For example, propylene carbonate (PPC) can be decomposed in an inert atmosphere or in air without leaving an obvious residue behind. It is generally contemplated that the decomposition temperature be between 120° C. and 230° C. If a decomposition temperature of between 200° C. and 300° C. is used, the porogen portions 64 and 66 can be replaced with air within a short amount of time. If the decomposition temperature has to be lowered, it may be possible to add additives or to lengthen the baking time. A decomposition temperature of between 120° C. and 160° C. is possible with a suitable combination of materials, film thicknesses and baking time. The baking temperature and temperature ramp rate need to be carefully controlled so that no significant residue is left behind and so that the rate of release of the porogen gas is controlled in order to not cause damage to the first front cap layer 74 and the first rear cap layer 76, such as popping, sagging and cracking.

When the cavities 88 and 90 are finally formed, the first portions 80 of the first front cap layer 74 and first rear cap layer 76 are secured to and are supported by the raised formations 32 and 46. Each one of the cavities 88 is defined on three sides by surfaces of a respective one of the recesses 30 and on a fourth side by one of the second portions 82 of the first front cap layer 74. Similarly, each one of the cavities 90 is defined on three sides by surfaces of the recesses 44 and on a fourth side by one of the second portions 86 of the first rear cap layer 76. What should be noted is that the second portions 82 and 86 of the first front cap layer 74 and the first rear cap layer 76 are not supported by the porogen portions 64 and 66 anymore. The first front cap layer 74 and the first rear cap layer 76 are however still supported by the raised formations 32 and 46 and, provided that the widths 40 and 54 of the cavities 88 and 90 are each less than 500 nm, the structural integrity of the first front cap layer 74 and the first rear cap layer 76 can be retained during and after outgassing of the solid porogen material.

Figure 1F:
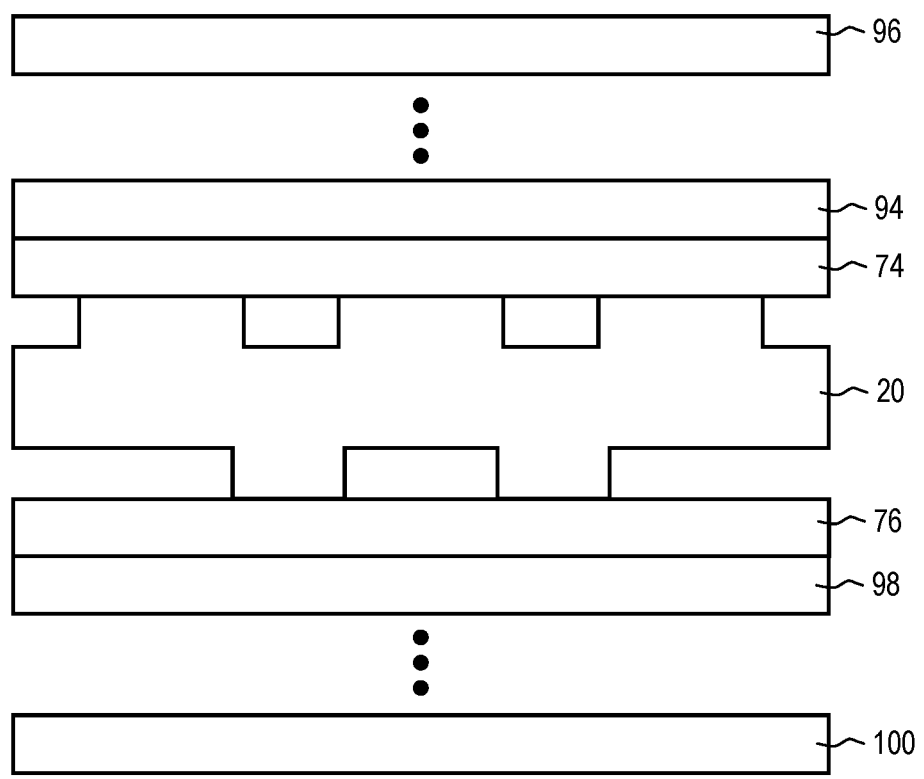
FIG. 1F is view similar to FIG. 1E after further cap layers are formed on the first front and first rear cap layers to finalize the fabrication of an optical system.

FIG. 1F illustrates the structure of FIG. 1E after a second front cap layer 94 is formed on the first front cap layer 74 and further front cap layers 96 are sequentially formed on the second front cap layer 94. The second front cap layer 94 provides additional strength to the first front cap layer 74. For better adhesion, an adhesion promoter such as Valmat® or TranSpin® can be used between the first and second front cap layers 74 and 94 and between the second front cap layer 94 and the further front cap layers 96.

The second front cap layer 94 and further front cap layers 96 are made of different select transparent materials. One or more of the materials of the first, second and further front cap layers 74, 94 and 96 are selected to have refractive indices that promote absorption of light and reduce reflection of light. In a practical example, the first front cap layer 74 is made of SiOx having a refractive index of 1.45, the second front cap layer 94 is made of TiOx having a refractive index of between 2.2 and 2.3, a third front cap layer is made of SiOx, and a fourth front cap layer is made of TiOx, wherein "x" is variable.

FIG. 1F also illustrates the structure of FIG. 1E after a second rear cap layer 98 is formed on the first rear cap layer 76 and further rear cap layers 100 are sequentially formed on the second rear cap layer 98. The second rear cap layer 98 provides additional strength to the first rear cap layer 76. For better adhesion, an adhesion promoter such as Valmat® or TranSpin® can be used between the first and second rear cap layers 76 and 98 and between the second rear cap layer 98 and the further rear cap layers 100.

The second rear cap layer 98 and further rear cap layers 100 are made of different select transparent materials. One or more of the materials of the first, second and further rear cap layers 76, 98 and 100 are selected to have refractive indices that promote absorption of light and reduce reflection of light. In a practical example, the first rear cap layer 76 is made of SiOx having a refractive index of 1.45, the second rear cap layer 98 is made of TiOx having a refractive index of between 2.2 and 2.3, a third rear cap layer is made of SiOx, and a fourth front rear layer is made of TiOx, wherein "x" is variable.

Figure 1G:
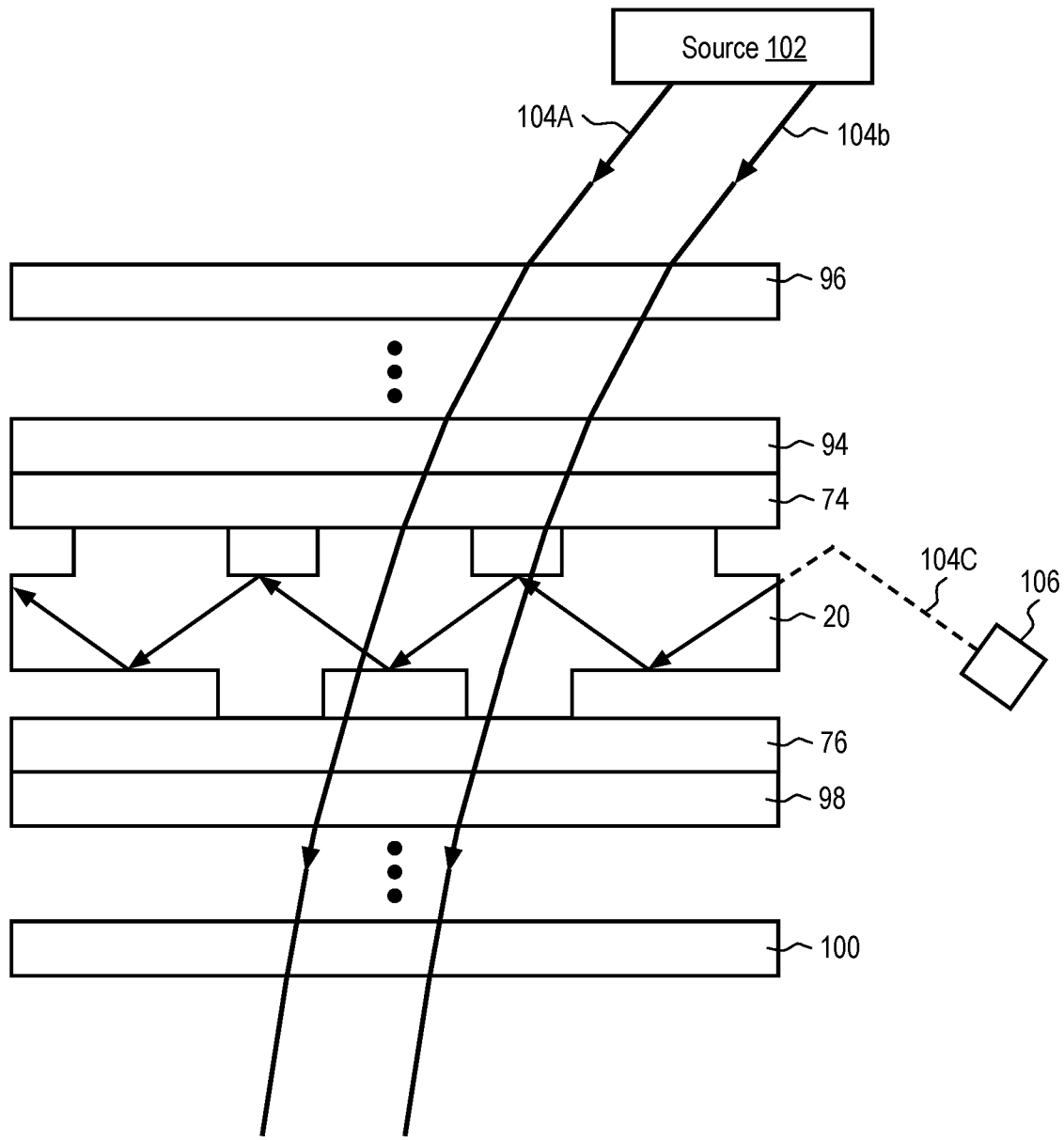
FIG. 1G is a view similar to FIG. 1F of the optical system and shows its functioning.

FIG. 1G further shows a source 102 of ambient light and a projector 106. The source 102 of ambient light may for example be an object that reflects ambient light. The ambient light is represented by beams 104A and 104B. Each beam 104A and 104B transmits through environmental air, and then sequentially passes through the front cap layers 96, 94 and 74, through the waveguide 20 and through the rear cap layers 76, 98 and 100. The indices of refraction between adjacent cap layers is minimized to minimize reflection of the ambient light and to promote absorption of the ambient light into the waveguide 20. The beam 104A also passes through air in one of recesses 44 in the rear side 24 of the waveguide 20. The beam 104B passes through air in one of the recesses 30 in the front side 22 of the waveguide 20.

The projector 106 generates projected light represented by the beam 104C. The beam 104C is inserted into the waveguide 20. The beam 104C may for example be inserted through the rear cap layers 100, 98 and 76 and their indices of refraction are selected to promote absorption and to limit reflection of the beam 104C. The beam 104C is directed to one of the recesses 30 in the front side 22. A difference between the index of refraction of the waveguide 20 and the index of refraction of the air in the recess 30 is maximized to promote reflection of the beam 104C and to limit transmission of the beam 104C into the air in the recess 30. The air has an index of refraction of 1 and the waveguide 20 may have an index of refraction of at least 1.74. The indices of refraction thus differ from one another by at least 0.74. In another embodiment, another optical gas may be used instead of air, provided that such an optical gas has an index of refraction of less than 1.3. Ideally, the indices of refraction between the material of the waveguide 20 and the optical gas should be at least 0.50. The beam 104C that is reflected from the air in one of the recesses 30 subsequently transmits to one of the recesses 44 in the rear side 24 of the waveguide 20. The beam 104C reflects from the interface between the air in the recess 44 towards another one of the recesses 30 in the front side 22 of the waveguide 20. An alternate structure can be a direct imprint pattern using Si containing resist over a spinsoated paraben material that is then evaporated. The Si containing resist can be plasma treated to form a SiOx polymer structure.

Reflection of an air interface significantly improves optical image quality by changing optical artifacts such as 1) improving overall transmissivity of world light through the 'transparent' eye-piece, making world side objects clearer and brighter; 2) maintaining an index difference between relief structure trench versus grating height, allowing high diffraction efficiency of grating constituting the function waveguide relief structure; 3) reducing ghost artifacts from reflection of light exiting the eye piece and reflecting back from different lens or stacked waveguide interfaces; and 4) reducing outside light from diffraction into to the users' eye box and creating rainbow defects which otherwise are much stronger without the nano-feature and film stack architecture.

Figure 1H:
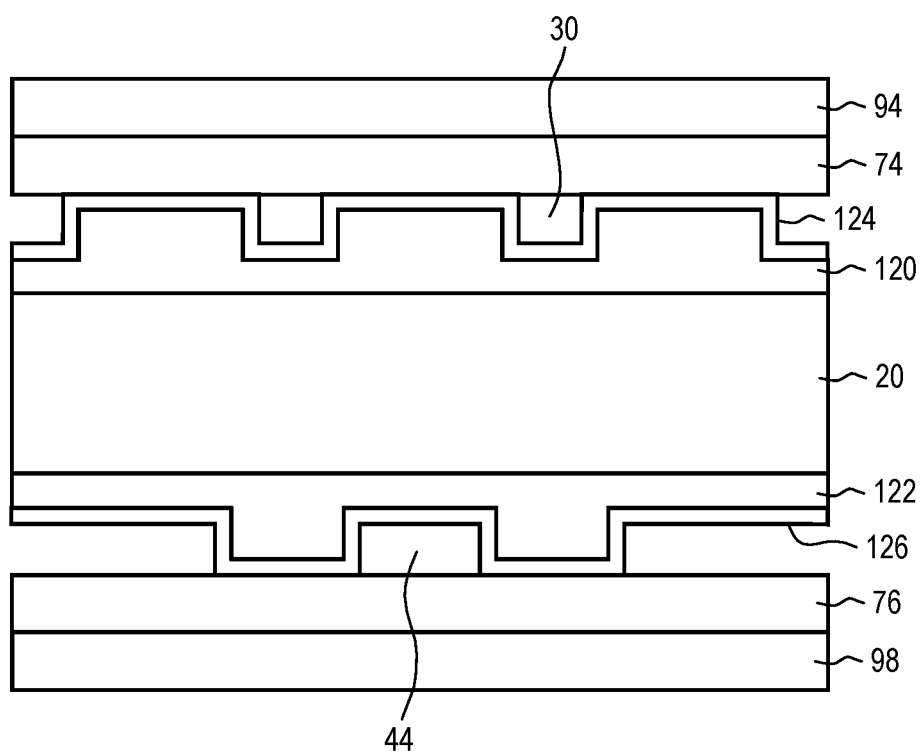
FIG. 1H is a cross-sectional side view of an optical system according to an alternate embodiment of the invention wherein patterned layers are formed from photoresist material.

FIGS. 1A to 1G illustrate one example of creating an anti-reflective cap structure. Anti-reflective properties can also be manufactured using alternative methods. FIG. 1H illustrates an optical system wherein front and rear patterned layers 120 and 122 are formed on front and rear sides of a waveguide 20. The layers 120 and 122 may be patterned using a conventional photo-lithographic technique and are made of a polymer or a photoresist material that is suitable for patterning using photo-lithography. No additional etch step is required. The layers are then coated with front and rear conformal layers 124 and 126 respectively. The conformal layers are made of inorganic SiOx and are formed using chemical vapor deposition. The conformal layers 124 and 126 define recesses 30 and 44 and the recesses 30 and 44 are covered with front and rear cap layers 74 and 76.

Figure 2:
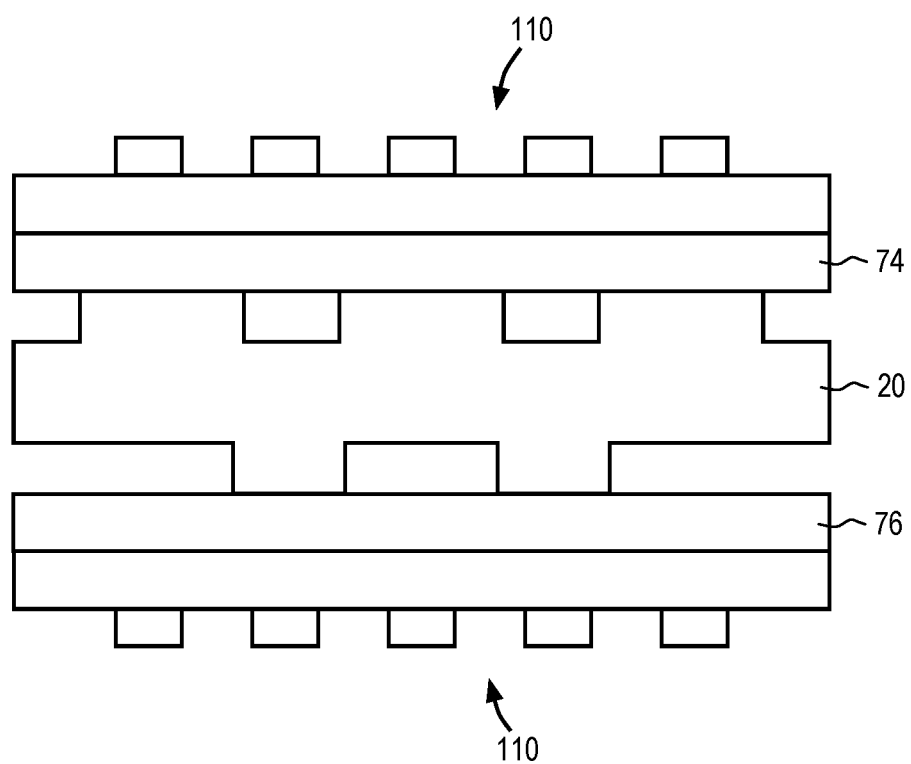
FIG. 2 is a cross-sectional side view of an optical system according to an alternate embodiment of the invention having nanostructures to promote absorption of ambient light.

FIG. 2 illustrates an alternate structure wherein nanopatterning 110 is carried out on an external surface instead of multiple cap layers as described in FIG. 1F. The nanopatterning 110 reduces reflection of ambient light and promotes absorption of ambient light. FIG. 2 has reference numerals that are similar to the reference numerals used in FIG. 1F and like reference numerals indicate like or similar components.

Figure 3:
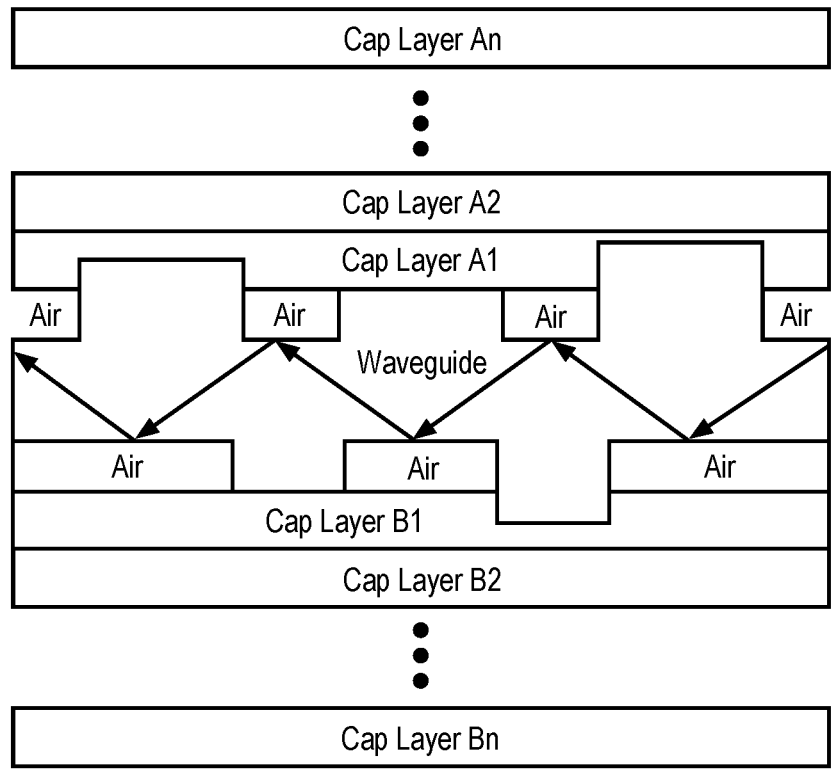
FIG. 3 is a cross-sectional side view similar to FIG. 1F with nanostructures having variable feature height or variable duty cycles.
Figure 4:
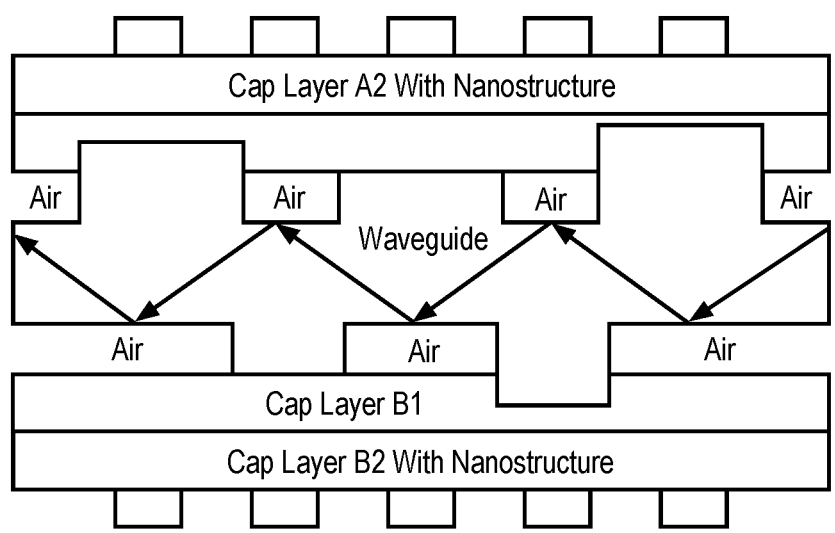
FIG. 4 is a cross-sectional side view similar to FIG. 2 having nanostructures with variable feature height or variable duty cycles.

FIGS. 3 and 4 are similar to FIGS. 1F and 2. The optical systems illustrated in FIGS. 3 and 4 have waveguides with variable height or "duty cycle". The porogen material can be formed in such structures in a spin coating operation as described before.

Figure 5:
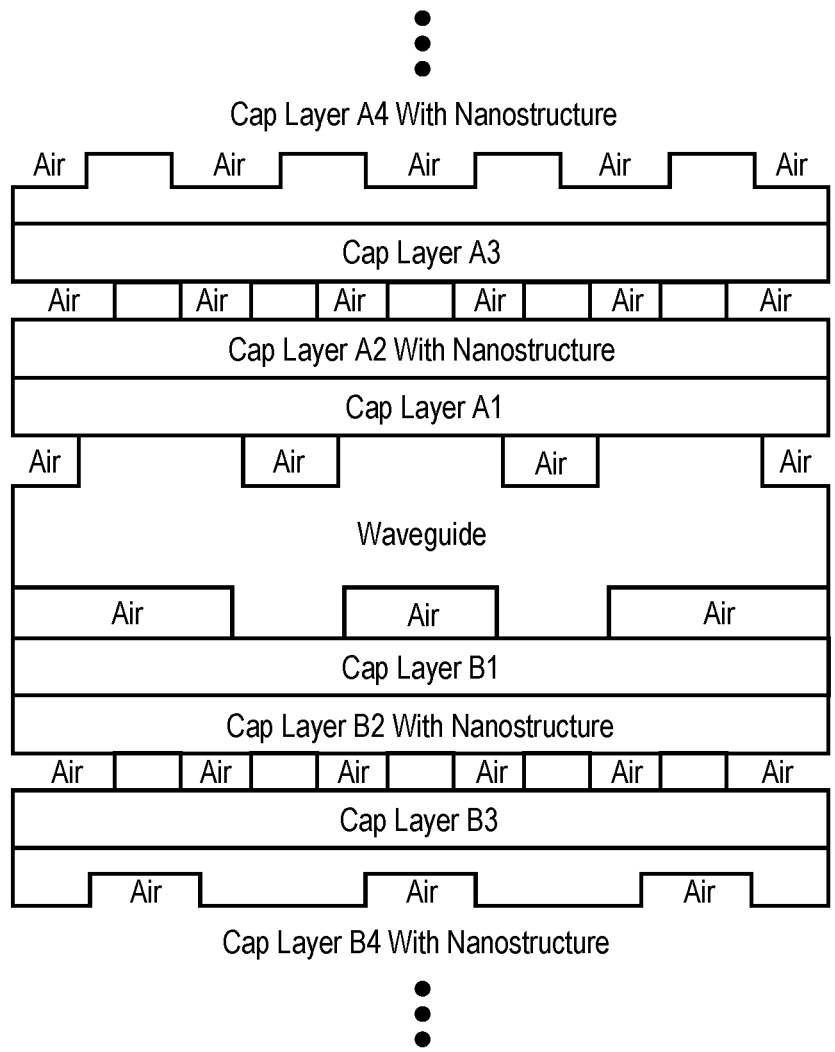
FIG. 5 is cross-sectional side view of an optical system having air pockets in different layers.

FIG. 5 illustrates a further optical system that has different layers of different of three-dimensional nanostructure stacks. The three-dimensional nanostructure stacks can be designed differently for different waveguide purposes. The materials composition, thicknesses and nanopatterning with various spatial and geometric configurations for each cap layer can be different or the same from one layer to the next.

Figure 6A:
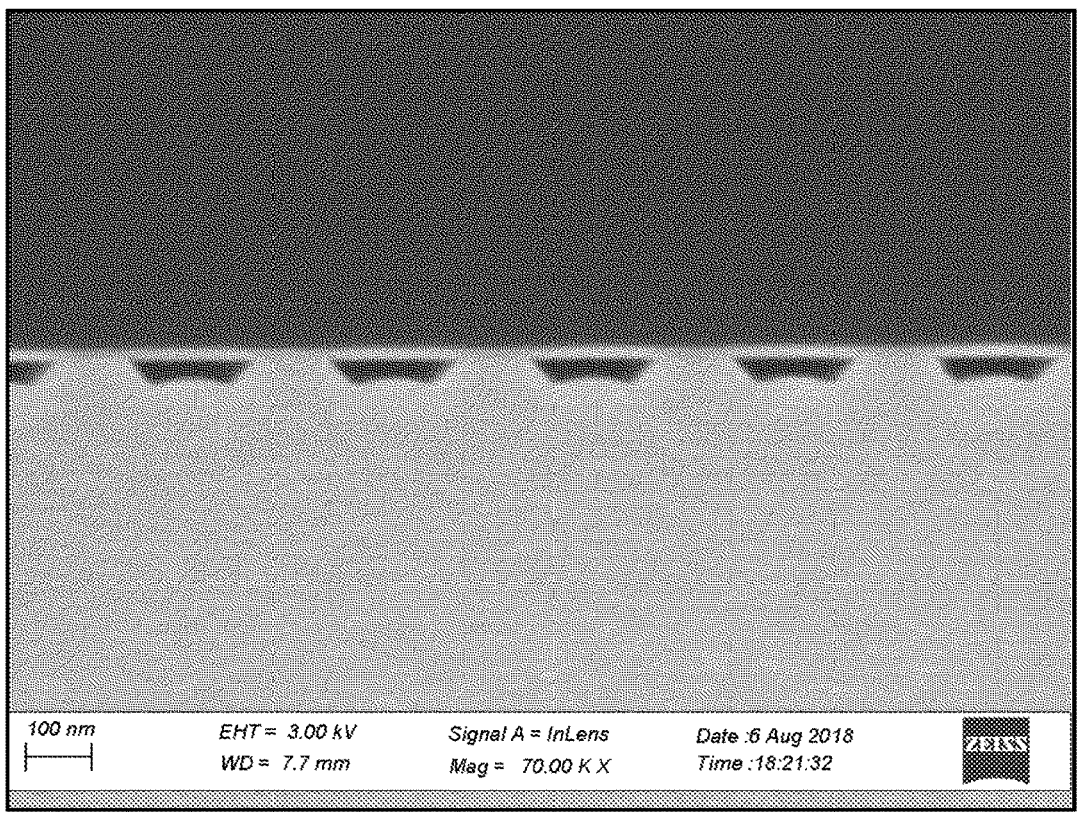
FIG. 6A is a scanning electron microscope (SEM) image with a single coating.
Figure 6B:
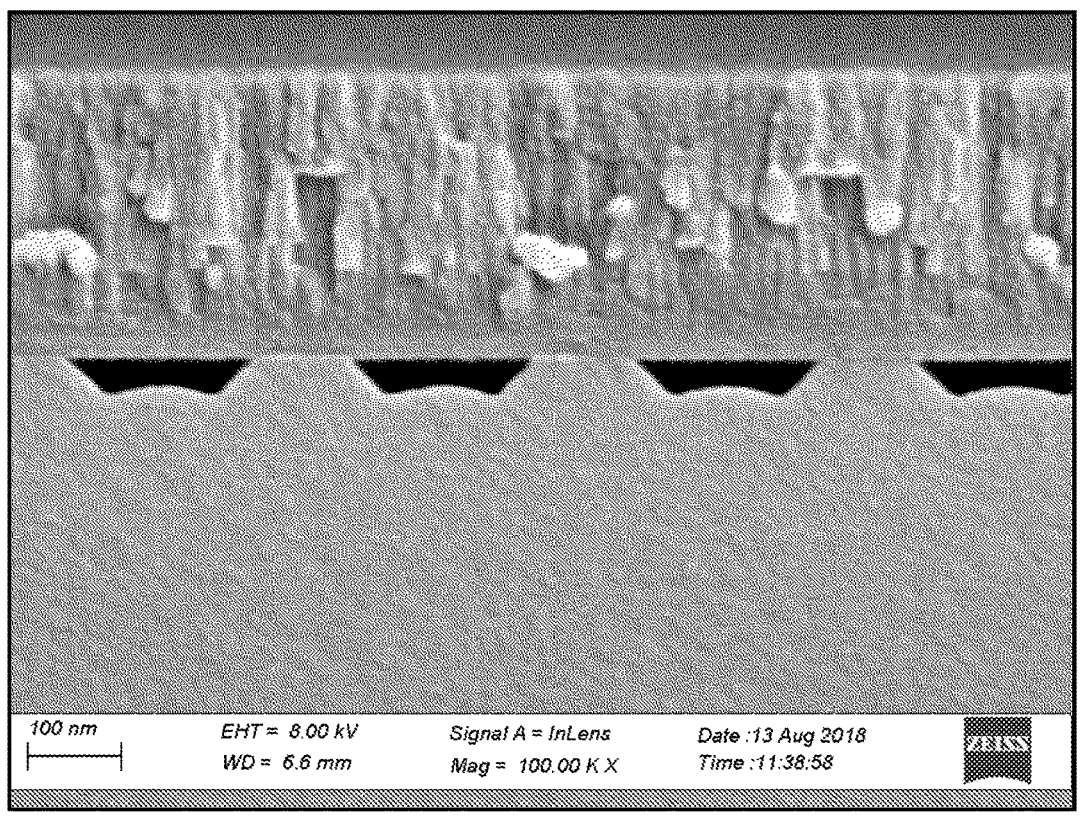
FIG. 6B is a SEM image of a capped air pocket with a multi-layered coating.

FIG. 6A illustrates a scanning electron microscope (SEM) image of a capped air pocket with a single layer of SiOx over etched grating in high index glass. FIG. 6B shows an SEM image of a capped air pocket with multi-layered coatings. The multi-layered coatings alternate between SiOx and TiOx with different thicknesses for each layer. The composition and thicknesses of the layers on top of the gratings, from bottom to top, are 20 nm porous SiOx, 15 nm TiOx, 65 nm SiOx, 34 nm TiOx, 18 nm SiOx, 59 nm TiOx, 97 nm SiOx. The multi-layer coatings on top of the air pocket structure can be applied by chemical and/or physical vapor deposition or spin coating or a combination of different coating techniques.

Figure 7A:
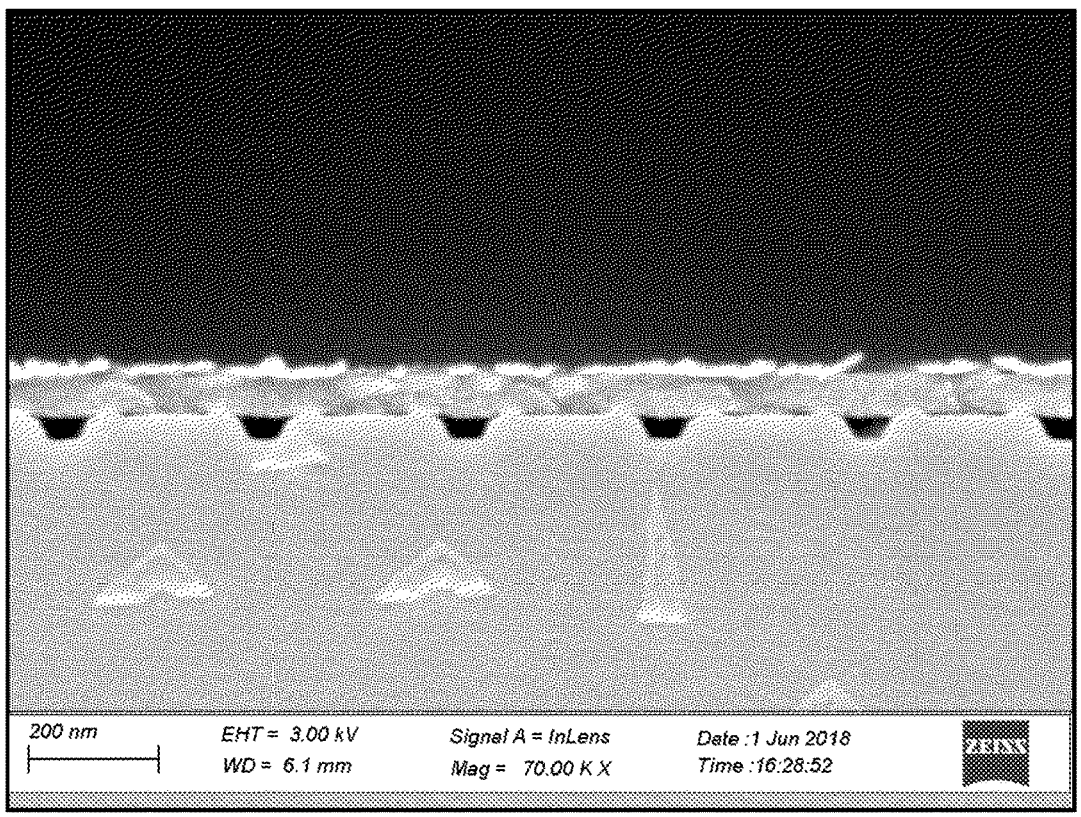
FIG. 7A is a cross-sectional side view of an air pocket capped with a silicon oxide layer and then spin coated with an optical polymer.
Figure 7B:
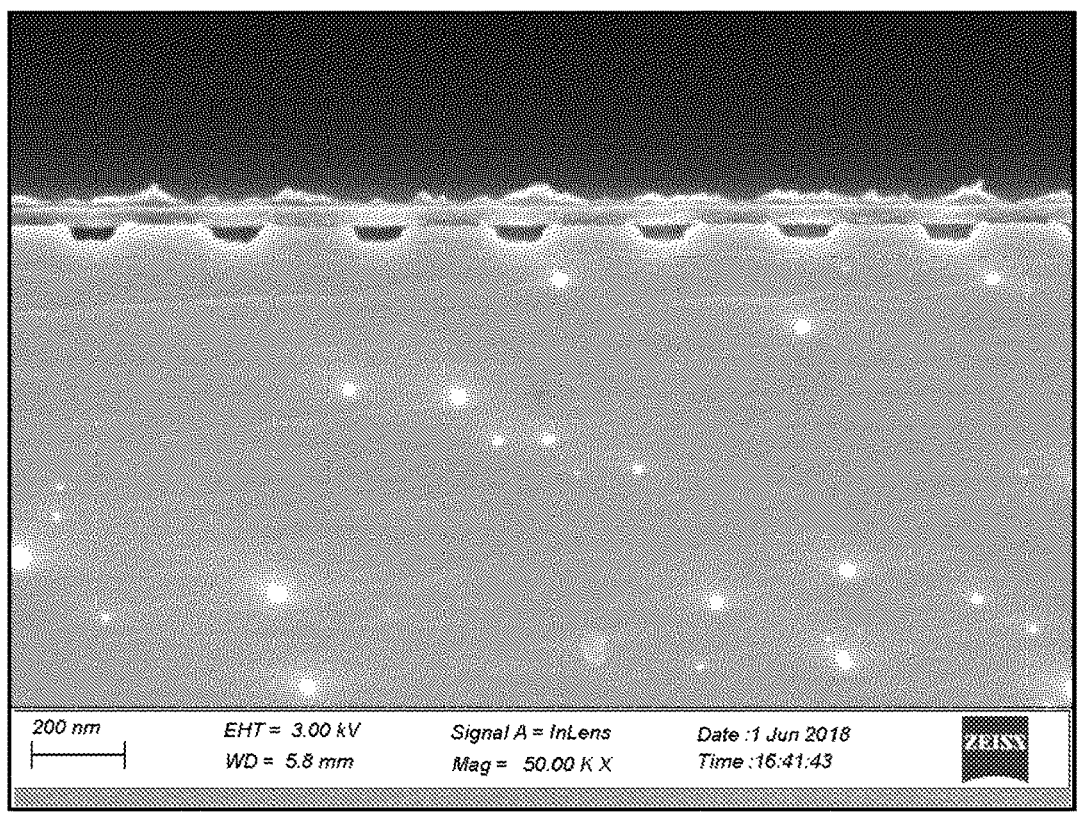
FIG. 7B is a view similar to FIG. 7A at a lower magnification level.

FIGS. 7A and 7B show a sample with air pocket capped first with a SiOx layer and then spin coated with an optical polymer with refractive index 1.31 (Teflon AF1600 from the Chemours Company). The air pockets reduced the effective refractive index of the nanostructured grating area, leading to a gradual refractive index change from the bulk substrate to the surface grating area to the SiOx cap layer to the spin coated optical polymer layer and finally to the air. This kind of gradual refractive index change is beneficial for anti-reflection purpose and can significantly enhance the transmission of ambient light.

Figure 8:
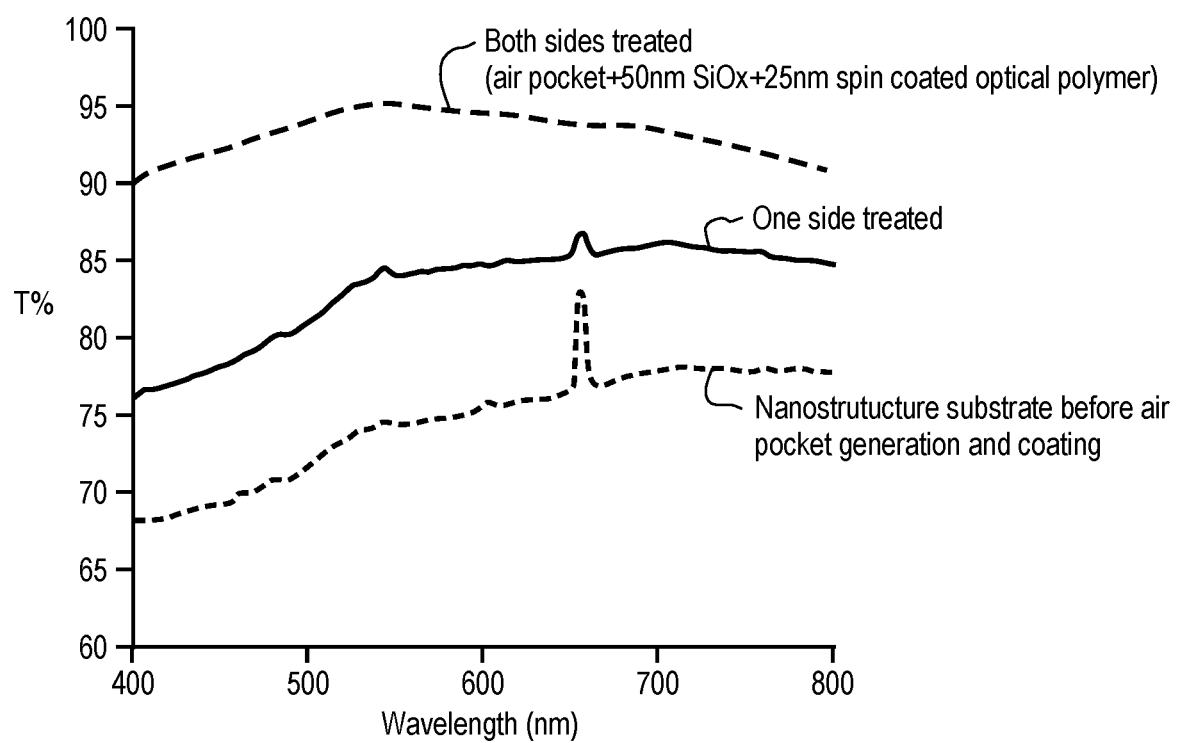
FIG. 8 is a 0° transmission graph from experimental measurements.

FIG. 8 is a 0° transmission graph from experimental measurement showing that the transmission is significantly increased by the combination of air pockets and coatings in FIGS. 7A and 7B. The nanostructured substrate here is a high-index lithium niobate substrate etched to form surface gratings.

Figure 9:
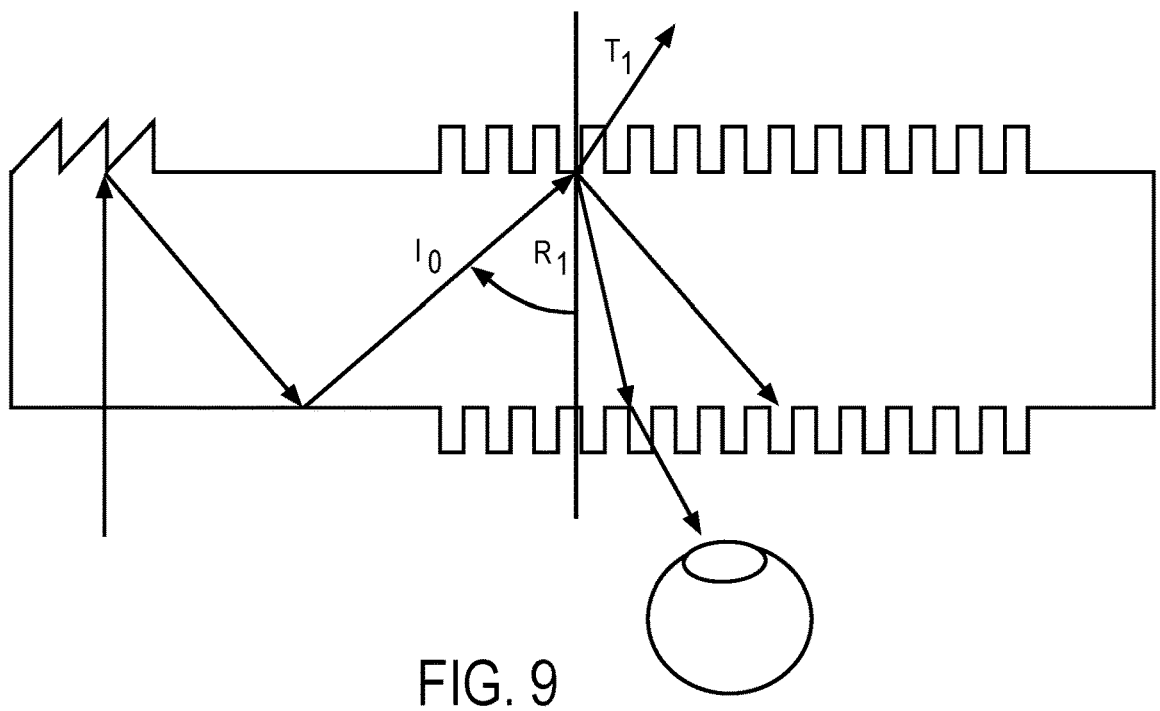
FIG. 9 is a model that is used for simulation purposes.
Figure 10A:
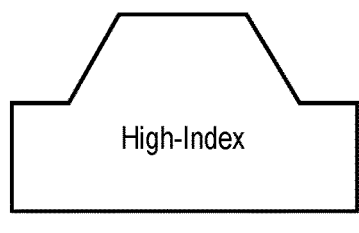
FIG. 10A is a side view of a waveguide without any coatings for the simulation.
Figure 10B:
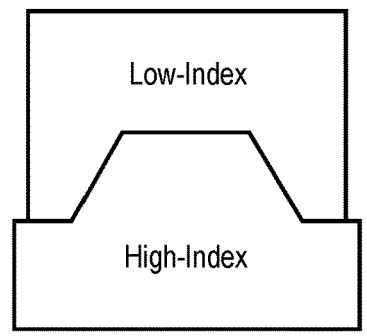
FIG. 10B is a side view of a waveguide with an optical polymer coating for the simulation.
Figure 10C:
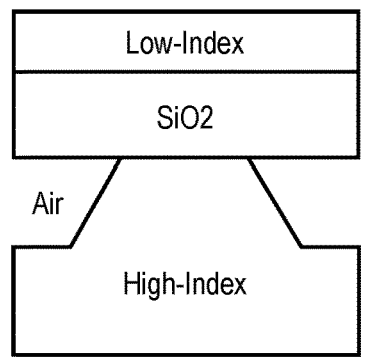
FIG. 10C is a side view of a waveguide with an air pocket for the simulation.
Figure 10D:
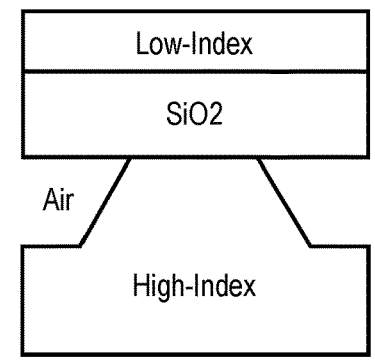
FIG. 10D is a side view of a waveguide with a polymer instead of an air gap for the simulation.
Figure 11:
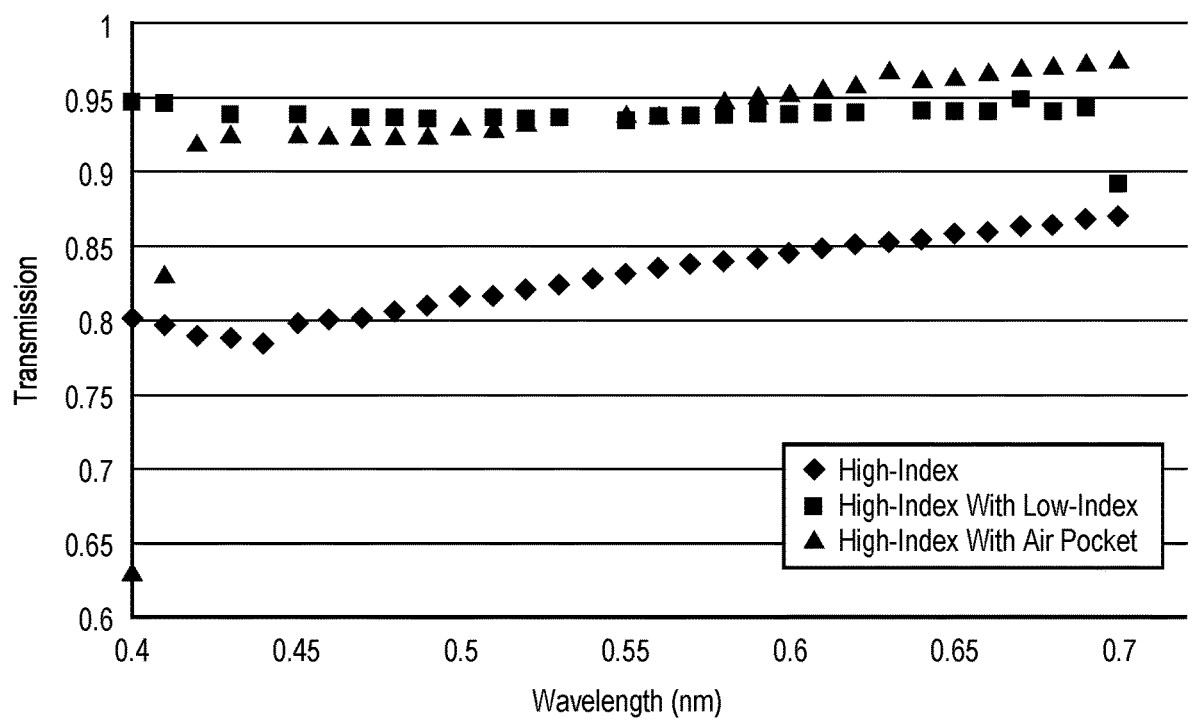
FIG. 11 is a graph showing transmission data from the simulation.
Figure 12:
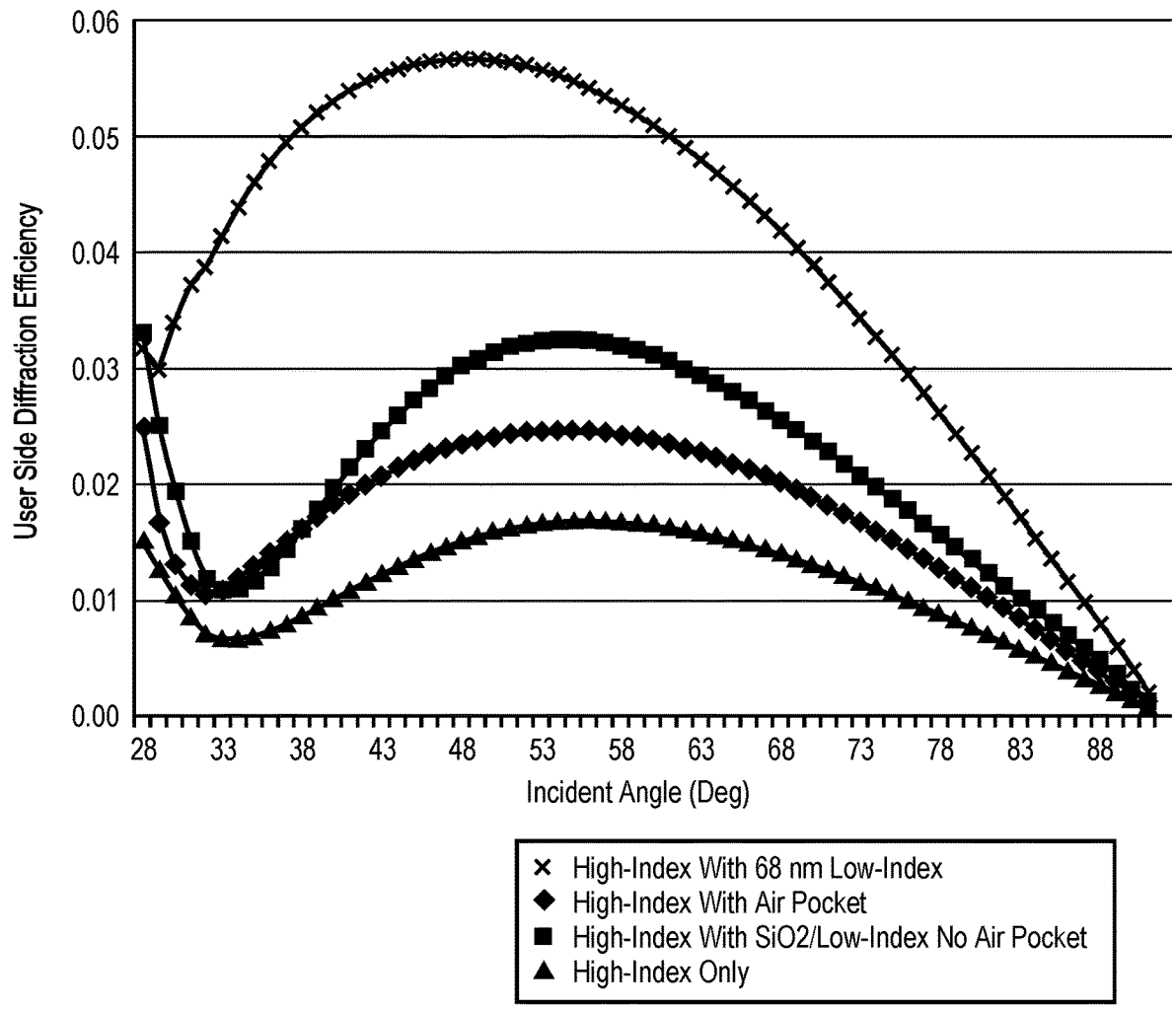
FIG. 12 is a graph showing user-side diffraction efficiency from the simulation.

FIG. 9 illustrates a model that is used for purposes of simulation of reflective properties. FIGS. 10A to 10D show four different anti-reflective coating stacking configurations that are simulated within the structure of FIG. 9. FIG. 10A is a side view of a waveguide without any coatings for the simulation. FIG. 10B is a side view of a waveguide with an optical polymer coating for the simulation. FIG. 10C is a side view of a waveguide with an air pocket for the simulation. FIG. 10D is a side view of a waveguide with a polymer instead of an air gap for the simulation. FIG. 11 is a graph that illustrates transmission data based on the simulation. FIG. 12 shows user-side diffraction efficiency from the simulation using high-index lithium niobate for the waveguide. It can be seen that for the simulated transmission data, directly spun-on low refractive index optical polymer (AF2400 from the Chemours Company, index 1.29) has a similar effect on enhancing the transmission compared to a configuration with an air pocket. However, for single bounce diffraction efficiency, the air pocket configuration is significantly better than the configurations that have only the spin-on low index polymer or with the stack with PPC fill the trench of the grating. The simulation shows that the diffraction efficiency is significantly higher than the situation with low index materials fill the trench, though still lower than the situation without any anti-reflective coatings applied. In order to further boost the efficiency, the grating geometry needs to be changed accordingly.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of manufacturing an optical system comprising:
   forming a stack that includes a waveguide, a solid porogen material and a cap layer; and
   replacing the porogen material with an optical gas, thereby securing the cap layer to the waveguide, the cap layer being made of a select transparent material and the waveguide being made of a high-index transparent material having front and rear sides, a cavity being defined between the cap layer and the waveguide with an optical gas in the cavity, wherein, in use, a source of ambient light is located on the front side of the waveguide, a beam of the ambient light transmits in the select transparent material of the cap layer, in the cavity holding the optical gas and in the high-index transparent material of the waveguide.

2. The method of claim 1, wherein the cap layer is a front cap layer located between the source of ambient light and the front side of the waveguide and the beam of the ambient light transmits sequentially through the select transparent material of the front cap layer, through the cavity holding the optical gas and into the high-index transparent material of the waveguide.

3. The method of claim 2, wherein the select transparent material of the front cap layer is an anti-reflective material that increases absorption of the ambient light by the front surface of the waveguide and reduces reflection of the ambient light by the front surface of the waveguide.

4. The method of claim 3, wherein the high-index material is one of high-index glass, high-index lithium niobate, lithium tantalite and silicon carbide.

5. The method of claim 3, wherein the high-index material has a refractive index of at least 1.74.

6. The method of claim 1, wherein the optical gas has an index of refraction of less than 1.3.

7. The method of claim 1, wherein the optical gas is air with an index of refraction of 1.

8. The method of claim 1, wherein the porogen material is removed by:
heating the porogen material to a decomposition temperature wherein the porogen material turns into a sacrificial gas; and
removing the sacrificial gas from the cavity.

9. The method of claim 8, wherein the select material of the cap layer is porous and the sacrificial gas outgasses through the select material of the cap layer.

10. The method of claim 9, wherein the cap layer is made of SiOx having a thickness of at least 12 nm, wherein x is variable.

11. The method of claim 8, wherein the porogen material decomposes at a decomposition temperature of between 120° C. and 230° C.

12. The method of claim 1, wherein multiple cavities are defined between the cap layer and the waveguide and an optical gas in each respective cavity.

13. The method of claim 12, further comprising:
forming the front side of the waveguide to have a plurality of recesses and a plurality of raised formations, each raised formation being located between two of the recesses; and
supporting first portions of the cap layer with the raised formations with second portions of the cap layer that are located between the first portions of the cap layer being located over the recesses to that a respective one of the cavities is defined by a respective on of the second portions of the cap layer and a respective one of the recesses in the front side of the waveguide.

14. The method of claim 13, wherein each recess has a depth and a width and the width is less than 300 microns.

15. The method of claim 13, wherein the recesses are imprinted on the front side.

16. The method of claim 13, further comprising:
forming a conformal layer on the front side of the waveguide, the conformal layer being made of a transparent material.

17. The method of claim 1, wherein the cap layer is a front cap layer located between the source of ambient light and the front side of the waveguide and the cavity is a front cavity between the front cap layer and the front side of the waveguide, further comprising;
securing a rear cap layer of a select transparent material to the waveguide, a rear cavity being defined between the rear cap layer and the rear of the waveguide with an optical gas in the rear cavity, such that, if a source of ambient light is located on the front side of the waveguide, a beam of the ambient light transmits in the high-index transparent material of the waveguide, in the rear cavity holding the optical gas and in the select transparent material of the rear cap layer.

18. The method of claim 1, wherein the cap layer is a first cap layer and the select transparent material is a first select transparent material, further comprising:
securing a second cap layer of a second select transparent material to the first cap layer.

19. The method of claim 18, wherein the second cap layer is more rigid than the first cap layer.

20. The method of claim 18, wherein at least one of the select transparent materials of the cap layers is an anti-reflective material that increases absorption of the ambient light by the front surface of the waveguide and reduces reflection of the ambient light by the front surface of the waveguide.

21. The method of claim 20, further comprising:
forming a stack of cap layers having refractive indices that alter in magnitude.

22. The method of claim 21, wherein the cap layers are made of SiOx having a refractive index of 1.45 and TiOx having a refractive index between 2.2 and 2.3, wherein x is variable.

23. An optical system, comprising:
a waveguide of a high-index transparent material having front and rear sides;
a stack of cap layers having refractive indices that alter in magnitude, including:
a first cap layer of a first select transparent material secured to the waveguide, a cavity being defined between the cap layer and the waveguide; and
a second cap layer of a second select transparent material secured to the first cap layer, wherein the second cap layer is more rigid than the first cap layer; and
an optical gas in the cavity, wherein, in use, if a source of ambient light is located on the front side of the waveguide, a beam of the ambient light transmits in the select transparent material of the cap layer, in the cavity holding the optical gas and in the high-index transparent material of the waveguide, wherein at least one of the select transparent materials of the cap layers is an anti-reflective material that increases absorption of the ambient light by the front surface of the waveguide and reduces reflection of the ambient light by the front surface of the waveguide, wherein the cap layers are made of SiOx having a refractive index of 1.45 and TiOx having a refractive index between 2.2 and 2.3, wherein x is variable.

24. A method of manufacturing an optical system comprising:
forming a stack of cap layers having refractive indices that alter in magnitude, including:
securing a first cap layer of a first select transparent material to a waveguide of a high-index transparent material having front and rear sides, a cavity being defined between the cap layer and the waveguide with an optical gas in the cavity; and
securing a second cap layer of a second select transparent material to the first cap layer, wherein the second cap layer is more rigid than the first cap layer wherein, in use, a source of ambient light is located on the front side of the waveguide, a beam of the ambient light transmits in the select transparent material of the cap layer, in the cavity holding the optical gas and in the high-index transparent material of the waveguide, wherein at least one of the select transparent materials of the cap layers is an anti-reflective material that increases absorption of the ambient light by the front surface of the waveguide and reduces reflection of the ambient light by the front surface of the waveguide, wherein the cap layers are made of SiOx having a refractive index of 1.45 and TiOx having a refractive index between 2.2 and 2.3, wherein x is variable.

* * * * *